(12) United States Patent
Rhodes et al.

(10) Patent No.: US 7,888,415 B2
(45) Date of Patent: Feb. 15, 2011

(54) VINYL ADDITION POLYCYCLIC OLEFIN POLYMERS PREPARED WITH NON-OLEFINIC CHAIN TRANSFER AGENTS AND USES THEREOF

(75) Inventors: Larry F. Rhodes, Silver Lake, OH (US); Dennis A. Barnes, Medina, OH (US); Andrew Bell, Lakewood, OH (US); Brian K. Bennett, Stansbury Park, UT (US); Chun Chang, Carmel, IN (US); John Henry Lipian, Medina, OH (US); Xiaoming Wu, Lexington, KY (US)

(73) Assignee: Promerus LLC, Brecksville, OH (US)

( * ) Notice: Subject to any disclaimer, the term of this patent is extended or adjusted under 35 U.S.C. 154(b) by 0 days.

(21) Appl. No.: 12/699,909

(22) Filed: Feb. 4, 2010

(65) Prior Publication Data

US 2010/0177488 A1  Jul. 15, 2010

Related U.S. Application Data

(62) Division of application No. 10/782,547, filed on Feb. 19, 2004, now Pat. No. 7,674,847.

(60) Provisional application No. 60/448,939, filed on Feb. 21, 2003.

(51) Int. Cl.
  *C08F 4/44*  (2006.01)
(52) U.S. Cl. .................. 524/171; 526/279; 526/282; 526/317.1; 526/905
(58) Field of Classification Search ............... 526/171, 526/279, 282, 317.1, 905
See application file for complete search history.

(56) References Cited

U.S. PATENT DOCUMENTS

| 5,468,819 | A | 11/1995 | Goodall et al. |
|---|---|---|---|
| 6,132,926 | A | 10/2000 | Jung |
| 6,136,499 | A | 10/2000 | Goodall et al. |
| 6,232,417 | B1 | 5/2001 | Rhodes et al. |
| 6,312,865 | B1 | 11/2001 | Jung |
| 6,322,948 | B1 | 11/2001 | Jung |
| 6,369,181 | B1 | 4/2002 | Jung |
| 6,372,869 | B1 | 4/2002 | Arthur et al. |
| 6,410,670 | B1 | 6/2002 | Lee |
| 6,455,650 | B1 | 9/2002 | Lipian et al. |
| 6,472,120 | B1 | 10/2002 | Jung |
| 6,569,599 | B2 | 5/2003 | Lee |
| 6,589,707 | B2 | 7/2003 | Lee |

FOREIGN PATENT DOCUMENTS

| EP | 1092730 A1 | 4/2001 |
|---|---|---|
| JP | 10-130311 * | 5/1998 |
| JP | 10130311 A | 5/1998 |
| JP | 10130312 A | 5/1998 |
| JP | 2001516780 | 10/2001 |
| JP | 2002504573 | 2/2002 |
| JP | 2002179875 A | 6/2002 |
| JP | 2002293843 A | 9/2002 |
| JP | 2004500596 | 1/2004 |
| WO | 9720872 A1 | 6/1997 |
| WO | 0043426 A1 | 7/2000 |

OTHER PUBLICATIONS

Barclay et al., "The 'Living' Free Radical Synthesis of Poly(4-hydroxystyrene): Physical Properties and Dissolution Behavior," Macromolecules, 1998, pp. 1024-1031, vol. 31, Issue 4.

Zudin et al., "Study of the Reaction of Tetrakis (Triphenylphosphine) Palladium (0) with Acids," Koordinatsionnaya Khimiya, Mar. 1979, pp. 432-438, vol. 5, No. 3.

Zudin et al., "Formation and Reactivity of Palladium Hydride Complexes, [(PPh3)3PdH]+ and [(PPh3)2Pd(μ-H)(μ-CO) Pd(PPh3)2]+, in Aqueous Trifluoroacetic Acid Solutions," J. Organometallic Chem., 1985, pp. 425-430, vol. 289.

Zudin et al., "Determination of Key Intermediates for Homogeneous Water-Gas Shift Reaction and Hydrocarbonylation of Ethylene to Diethyl Ketone Catalyzed by the 'Pd(Oac)2-PPh3-CF3COOH/H2O' System," J. Molecular Catalysis, 1989, pp. 27-48, vol. 52.

Heaton et al., "Characterisation of Hydridopalladium Complexes," J. Chem. Soc. Dalton Trans., 1993, pp. 3081-3084.

Sudhakar et al., "Norbornadiene as an Efficient Hydrogen Scavenger for the Palladium-Catalyzed Conversion of Hydrosilanes to Alkoxysilanes," J. Org. Chem., 2002, pp. 6860-6862, vol. 67, No. 19.

Perch et al., "Reductive Cyclization of Dimethyl Diallylmalonate Catalyzed by Palladium-Bisoxazoline Complexes in the Presence of Silane and Water," Organometallics, 2000, pp. 2541-2545, vol. 19, No. 13.

Kisanga et al., "Development, Synthetic Scope, and Mechanistic Studies of the Palladium-Catalyzed Cycloisomerization of Functionalized 1,6-Dienes in the Presence of Silane," J. Am. Chem. Soc., 2000, pp. 10017-10026, vol. 122, No. 41.

Barnes, Jr. et al., "The Preparation of Organosilanols via the Metal-Catalyzed Reaction of Organosilicon Hydrides with Water," J. Org. Chem., Mar. 1966, pp. 885-887, Vol. 31, No. 3.

PCT International Search Report, Jul. 16, 2004.

* cited by examiner

*Primary Examiner*—Robert D. Harlan
(74) *Attorney, Agent, or Firm*—The Webb Law Firm

(57) ABSTRACT

A method of polymerizing poly(cyclic)olefin monomers encompassing (a) combining a monomer composition containing the poly(cyclic)olefin monomers, a non-olefinic chain transfer agent and an activator compound to faun a mixture; (b) heating the mixture; and (c) adding a polymerization catalyst containing Ni and/or Pd. The non-olefinic chain transfer agent includes one or more compounds selected from $H_2$, alkylsilanes, alkylalkoxysilanes, alkylgermanes, alkylalkoxygermanes, alkylstannanes, and alkylalkoxystannanes. The activator is characterized as having an active hydrogen with a pKa of at least 5. The resulting poly(cyclic)olefin polymers can be used in photoresist compositions.

30 Claims, 8 Drawing Sheets

VINYL ADDITION POLYCYCLIC OLEFIN POLYMERS PREPARED WITH NON-OLEFINIC CHAIN TRANSFER AGENTS AND USES THEREOF

CROSS-REFERENCE TO RELATED APPLICATIONS

This application is a divisional of and claims priority under 35 U.S.C. §121 to U.S. Nonprovisional application Ser. No. 10/782,547, filed Feb. 19, 2004, which claims priority to U.S. Provisional Application No. 60/448,939 entitled "Vinyl Addition Polycyclic Olefin Polymers Using Non-Olefinic Chain Transfer Agents," filed Feb. 21, 2003.

BACKGROUND OF THE INVENTION

1. Field of the Invention

The present invention relates generally to polycyclic olefin polymers and particularly to polycyclic olefin polymers prepared with non-olefinic chain transfer agents and uses of such polymers.

2. Description of Related Art

To meet the requirement of the semiconductor industry for smaller device sizes to produce faster and more complex devices, improvements in the resolution capabilities of current photolithographic process must be made. One area being explored for such improvements is the use of short wavelength exposure sources, for example sources that provide wavelengths of 193 nanometers (nm) and 157 nm, since it is known that imaging resolution increases as the wavelength of the imaging radiation decreases. However, current photoresist compositions which are employed for longer wavelength radiation sources, 248 nm and above, are generally not usable for exposure at 193 nm and below, as they are too absorptive at such short wavelengths. Further, the optical density (OD) of such current resist compositions is too high at wavelengths of 193 nm and below to be viable for exposure at such wavelengths. Therefore, to take advantage of the resolution benefit such short wavelength radiation affords, new photoresist compositions that have sufficiently low ODs at 193 nm and below must be made available.

Poly(cyclic) olefin polymers, such as those including norbornene-type structures, have shown promise for use in photoresist compositions suitable for exposure at wavelengths such as 197 nm and 153 nm. However, such materials must also possess other characteristics in order to make them truly viable. For example, a positive acting (positive tone) photoresist should have a high dissolution rate after exposure and post-exposure thermal treatment, as such high dissolution rates are both a factor in development of the image; that is to say removing the exposed regions of photoresist and providing for high wafer throughput in an integrated circuit manufacturing environment. It is generally known that low molecular weight polymers, such as those used for photoresist compositions, tend to exhibit higher dissolution rates than their higher molecular weight analogs. Unfortunately, it is also known that such low molecular weight materials generally have a higher OD than their higher molecular weight analogs. (See, Barclay et. al. *Macromolecules* 1998, 31, 1024 for a discussion of these issues for poly(4-hydroxystyrene), the preferred material for 248 nm photoresists.) As a result, it is often necessary for a person formulating such a polymer to target a higher molecular weight than desired for an optimal dissolution rate so that an acceptable OD can be obtained. It follows then that this compromise between optimal dissolution rate and optimal OD results in a photoresist composition that is not optimized for either characteristic.

One method of overcoming the results of this compromise is through the use of optically transparent dissolution rate modifiers (DRMs), a material that can be added to the photoresist composition to enhance the dissolution rate in the exposed areas of the resist. While such DRMs are useful, providing such materials is an extra step that increases both the complexity of the resist composition and its cost. Hence, it would be advantageous to be able to provide a polymer for a photoresist composition that is optimized for both a low OD at the target wavelength and a low molecular weight, thus making the use of a DRM in such compositions an optional material to further enhance the composition's performance.

One method for providing norbornene-type polymers with controllably low molecular weights was disclosed in U.S. Pat. No. 5,468,819, incorporated herein by reference. This method employs olefinic chain transfer agents (CTAs) such as ethylene, 1-hexene, 1-decene, and the like, with both nickel and palladium catalysts. While this method has been successful for providing controllably low molecular weight polymers, it was observed that the OD of the resulting polymers tended to increase as the molecular weight of the polymers decreased.

FIG. 1 shows a plot of OD (at 193 nm) versus molecular weight (Mw) for homopolymers of α,α-bis(trifluoromethyl) bicyclo[2.2.1]hept-5-ene-2-ethanol (HFANB). The plot shows the trend of OD increasing as the molecular weight of the polymers decreases. Such an increase is believed to be due to the incorporation of olefinic terminal groups into the resulting polymer. It was subsequently found that when the olefinically terminated cyclic olefin polymers were treated (after polymerization) with, for example, peracetic acid, the OD was lowered. It is believed that the peracetic acid lowers the OD by converting the highly absorbing olefinic terminal groups into less absorbing epoxides. Referring to FIG. 2, the result of a peracetic acid post-treatment on homopolymers of HFANB is shown by comparing the data points of FIG. 1 with additional data points reflective of OD after peracid post-treatment. Treatment with peracetic acid results in a reduced optical density. The same trend has been observed for polymers of HFANB and the t-butylester of 5-norbornene carboxylic acid (t-BuEsNB).

While post-treatment of olefinically terminated poly(cyclic) olefins with, for example, peracetic acid successfully creates polymers with a low OD at 193 nm, it requires an additional synthetic step after polymerization, an epoxidation. It would be desirable then to find an alternative method of providing controllably low molecular weight polymers that have desirably low ODs without the need for an additional synthetic step, for example, a method that does not result in the addition of absorptive terminal groups during the polymerization. In this manner, the need to compromise between OD and other molecular weight dependent properties, such as dissolution rate, is eliminated or at least reduced and the synthesis of the polymers is simplified. However, it should be realized that any such alternate method should also provide polymerizations having high conversion rates (greater than about 50%) while not substantially deprotecting acid labile groups (for positive tone resists) or deleteriously reacting with pendant groups such as hydroxyethyl ether (for negative tone resists) that are included as portions of the monomers selected for such polymerizations.

SUMMARY

Exemplary embodiments of the invention provide a method of polymerizing poly(cyclic)olefin monomers including:
(a) combining a monomer composition encompassing one or more poly(cyclic)olefin monomers, a non-olefinic chain transfer agent and an optional activator compound in a reaction vessel to form a mixture; and
(b) adding a polymerization catalyst containing Ni and/or Pd, the catalyst causing the mixture to polymerize;

wherein the non-olefinic chain transfer agent includes one or more compounds selected from $H_2$, alkylsilanes, alkylalkoxysilanes, alkylgermanes, alkylalkoxygermanes, alkylstannanes, and alkylalkoxystannanes.

Another exemplary embodiment of the invention includes poly(cyclic)olefin containing polymers prepared according to the above described method, as well as positive tone and negative tone photoresist compositions that contain such poly(cyclic)olefin polymers.

Additional exemplary embodiments of the invention are directed to hydroxyl functional unsaturated monomers described by Formula (Ib):

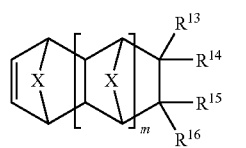
(Ib)

where X is selected from —$CH_2$—, —$CH_2$—$CH_2$—, O, S, and —NH—; m is an integer from 0 to 5; and each occurrence of $R^{13}$, $R^{14}$, $R^{15}$ and $R^{16}$ is independently selected from one of the following groups, with the proviso that at least one of $R^{13}$, $R^{14}$, $R^{15}$ and $R^{16}$ includes the hydroxyalkyl ether of Formula (IVa) shown below:
(a) H, $C_1$ to $C_{25}$ linear, branched, and cyclic alkyl, aryl, aralkyl, alkaryl, alkenyl and alkynyl;
(b) $C_1$ to $C_{25}$ linear, branched, and cyclic alkyl, aryl, aralkyl, alkaryl, alkenyl and alkynyl containing one or more hetero atoms selected from O, N, and Si; and
(c) a hydroxy alkyl ether according to Formula (IVa):

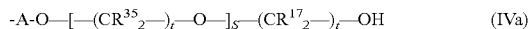
-A-O—[—($CR^{35}_2$—)$_t$—O—]$_s$—($CR^{17}_2$—)$_t$—OH (IVa)

where A is a linking group selected from $C_1$ to $C_6$ linear, branched, or cyclic alkylene; each occurrence of $R^{35}$ is independently selected from H, methyl, ethyl and a halide; each occurrence of $R^{17}$ is independently selected from H, methyl and ethyl; t is from 1 to 5; and s is from 0 to 3.

A further exemplary embodiment of the invention provides a negative tone photoresist composition that includes:
A) a solvent;
B) a photosensitive acid generator;
C) a crosslinking agent containing one or more functional groups; and
D) one or more negative tone imaging polymers derived from poly(cyclic)olefin monomers, where the polymers contains a functional group containing moiety having a functional group that is reactive with the functional groups of the crosslinking agent.

An additional exemplary embodiment of the invention provides a positive tone photoresist composition that includes:
A) a solvent;
B) a photosensitive acid generator; and
C) one or more positive tone imaging polymers derived from poly(cyclic)olefin monomers, where the polymer contains a functional group containing moiety that contains a group that can be cleaved when exposed to radiation, rendering the polymer more soluble to a developer than the unexposed polymer.

Also provided in an exemplary embodiment of the invention is an integrated circuit assembly method encompassing (a) coating a substrate with the negative tone or positive tone photoresist composition described above to form a film; (b) imagewise exposing the film to radiation to form an image; (c) developing the image in the film where selected portions of the substrate are exposed; and (d) transferring the developed image to the substrate. A particular embodiment provides an integrated circuit chip, multichip module, or circuit board that includes the integrated circuit provided by the above-described method.

DESCRIPTION OF EXEMPLARY EMBODIMENTS

Figure 1:
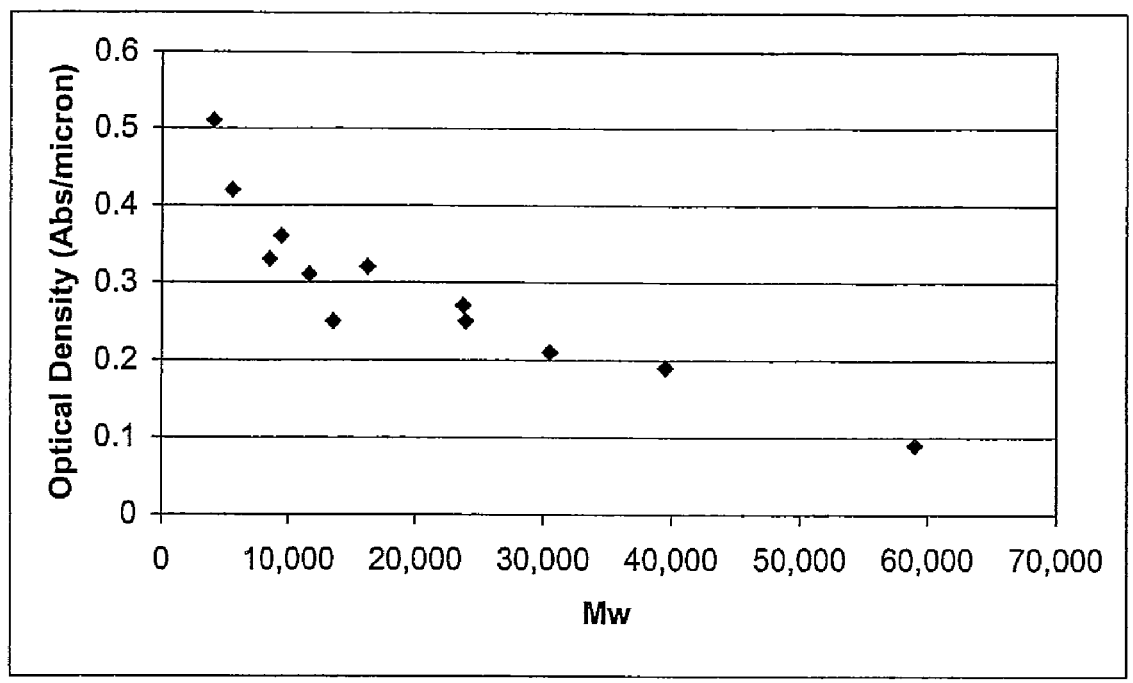
FIG. 1 shows a plot of optical density (at 193 nm) versus weight average molecular weight for α,α-bis(trifluoromethyl)bicyclo[2.2.1]hept-5-ene-2-ethanol (HFANB) homopolymers.
Figure 2:
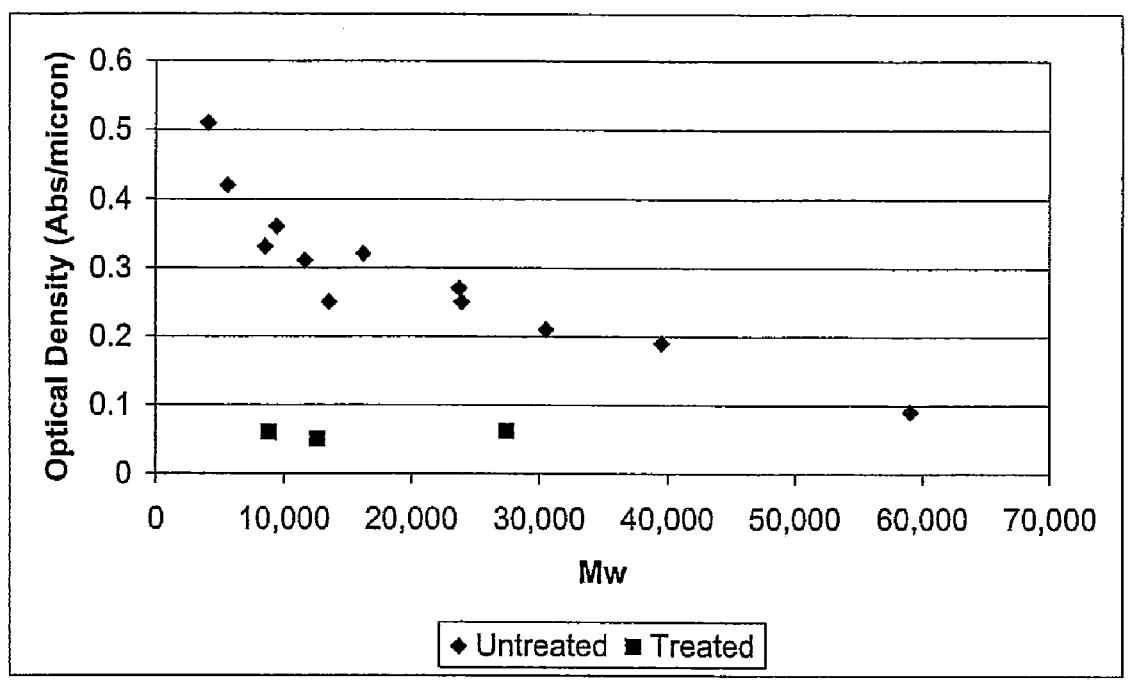
FIG. 2. shows a plot of optical density versus weight average molecular weight for HFANB homopolymers, with and without peracetic acid post-treatment.

Unless otherwise indicated, all numbers, values and/or expressions referring to quantities of ingredients, reaction conditions, etc., used herein are to be understood as modified in all instances by the term "about."

Various numerical ranges are disclosed in this patent application. Because these ranges are continuous, they include every value between the minimum and maximum values of each range, where the ranges refer to integers, they include every integer between the minimum and maximum values of each range. Unless expressly indicated otherwise, the various numerical ranges specified in this specification and in the claims are approximations that are reflective of the various uncertainties of measurement encountered in obtaining such values.

As used herein, the term "polymer composition" is meant to include a synthesized polymer, as well as residues from initiators, catalysts, and other elements attendant to the synthesis of the polymer, where such residues are understood as not being covalently incorporated thereto. Such residues and other elements considered as part of the polymer composition are typically mixed or co-mingled with the polymer such that they tend to remain with the polymer when it is transferred between vessels or between solvent or dispersion media. Polymer composition also includes materials added after synthesis of the polymer to provide or modify specific properties to the polymer composition.

It will be understood that in the context of this disclosure, the term "low molecular weight" should be taken to mean a polymer with a molecular weight of less than about 20,000 and the term "low OD" should be taken to mean an optical density (OD) of less than about 0.15 at 193 nm (for the homopolymer HFANB, where homopolymers of other monomers will have an analogously low equivalent OD) and less than about 1.5 at 157 nm (for the homopolymer HFANB, where homopolymers of other monomers will have an analogously low equivalent OD).

Therefore, embodiments in accordance with the present invention are directed to provide such an alternative method of forming polymers with controllable molecular weight that have desirably low ODs. The polymerization step of such embodiments employs non-olefinic chain transfer agents and, thus, does not result in the addition of absorptive terminal groups to eliminate the need for an additional synthetic step.

An embodiment of the present invention involves a method of polymerizing poly(cyclic)olefin monomers. The method includes (a) combining a monomer composition including the poly(cyclic)olefin monomer, a chain transfer agent and an optional activator compound in a reaction vessel to faun a mixture; (b) optionally heating the mixture to a first temperature; and (c) adding a polymerization catalyst containing Ni and/or Pd, the catalyst causing the mixture to polymerize. In an embodiment of the invention, the activator is characterized as having an active hydrogen with a pKa of at least about 5, in some cases at least about 7 and in other cases at least about 9.

In a further embodiment, the activator compound includes an active hydrogen, such as the hydrogen as an —OH group in water, alcohols and/or carboxylic acids. As a non-limiting example, the activator compound containing an —OH functional group is selected from water and $C_1$-$C_{24}$ linear, branched, and cyclic alkyl, aryl, and alkaryl moiety containing at least one hydroxyl group.

As used herein, "hydrocarbyl" refers to a radical of a group that contains only carbon and hydrogen, non-limiting examples being alkyl, aryl, aralkyl, alkaryl, and alkenyl. The term "halohydrocarbyl" refers to a hydrocarbyl group where at least one hydrogen has been replaced by a halogen. The term perfluorocarbyl refers to a hydrocarbyl group where all of the hydrogens have been replaced by fluorine.

As used herein, "alkyl" refers to a linear or branched acyclic or cyclic, saturated hydrocarbon group having a carbon chain length of, for example, from $C_1$ to $C_{25}$. Nonlimiting examples of suitable alkyl groups include, but are not limited to, —$(CH_2)_3CH_3$, —$(CH_2)_4CH_3$, —$(CH_2)_5CH_3$, —$(CH_2)_{10}CH_3$, —$(CH_2)_{23}CH_3$ and cyclohexyl. The term "alkylol refers to alkyl groups that include one or more hydroxyl groups.

As used herein the term "aryl" refers to aromatic groups that include, without limitation, groups such as phenyl, biphenyl, benzyl, xylyl, naphthalenyl, anthracenyl and the like, as well as heterocyclic aromatic groups that include, without limitation, pyridinyl, pyrrolyl, furanyl, thiophenyl and the like.

As used herein, "alkaryl" refers to a linear or branched acyclic alkyl group substituted with at least one aryl group, for example, phenyl, and having an alkyl carbon chain length of $C_2$ to $C_{25}$. The aryl group can be further substituted, if desired. Nonlimiting examples of suitable substituent groups for the aryl group include, among others, hydroxyl groups, benzyl groups, carboxylic acid groups and aliphatic hydrocarbon groups.

As used herein, "aralkyl" refers to an aryl group substituted with at least one linear or branched acyclic alkyl group, for example, phenyl having an alkyl substituent group with a carbon chain length of $C_2$ to $C_{25}$. The aryl group can be further substituted, if desired. Nonlimiting examples of suitable substituent groups for the aryl group include, among others, hydroxyl groups, benzyl groups, carboxylic acid groups, and aliphatic hydrocarbon groups. The alkyl group can be substituted with halogens.

As used herein, "alkenyl" refers to a linear or branched acyclic or cyclic hydrocarbon group having one or more double bonds and having an alkenyl carbon chain length of $C_2$ to $C_{25}$.

Any suitable non-olefinic chain transfer agent can be used in embodiments of the present invention. Suitable chain transfer agents include those that do not result in a terminal unsaturated group in the resulting polymer and those that undergo sigma bond metathesis reactions. As a non-limiting example, sigma bond metathesis reactions include replacing a sigma bond ligand, as in the metal catalyst-polymer chain sigma bond ligand, with an incoming sigma bond metathesis reagent, for example reagent "G-K". As shown below, this results in a Metal-G bond and a polymer chain terminated with K:

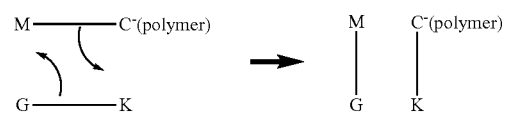

Thus in the sigma bond metathesis reaction shown above, the chain transfer agent undergoes sigma bond metathesis and thereby controls the molecular weight of the resulting polymer by terminating the polymer backbone without the introduction of an olefinic group. The non-olefinic chain transfer agents of embodiments of the present invention include $H_2$, alkylsilanes, alkylalkoxysilanes, alkylgermanes, alkylalkoxygermanes, alkylstannanes, alkylalkoxystannanes and mixtures thereof. Particular embodiments of the non-olefinic chain transfer agent include dihydrogen ($H_2$) and alkyl silanes. Non-limiting examples of such alkyl silanes encompassing triethylsilane and tri-i-propylsilane. In addition, alkyl germanes, for example tributylgermanium hydride and alkyl stannanes, such as tributyltin hydride may also be useful. Some embodiments in accordance with the present invention are directed to polymers, formed using such a method, that are useful for both positive acting (positive tone) and negative acting (negative tone) photoresist compositions.

In an embodiment of the invention, the chain transfer agent is an alkylsilane and/or alkylalkoxysilane selected from $HSiR^{48}_3$, $HSi(OR^{48})_1R^{48}_2$, $HSi(OR^{48})_2R^{48}_1$, $Si(OSiR^{49}_3)_4$, $HSi(OSiR^{48}_3)R^{48}_2$, $HSi(OSiR^{48}_3)_2R^{48}$, Si—H containing cyclotetrasiloxanes, and mixtures thereof, where each occurrence of $R^{48}$ is independently selected from linear, branched or cyclic $C_1$ to $C_{10}$ alkyl and each occurrence of $R^{49}$ is independently selected from H and linear, branched or cyclic $C_1$ to $C_{10}$ alkyl, where at least one occurrence of $R^{49}$ is H.

As used herein, the term "Si—H containing cyclotetrasiloxanes" refers to compounds according to Formula (A):

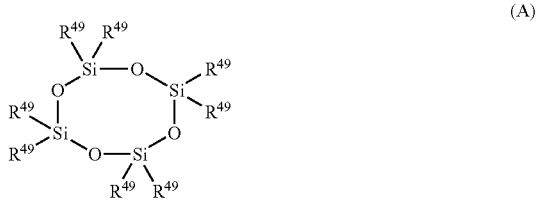

where and each occurrence of $R^{49}$ is independently selected from H and linear, branched or cyclic $C_1$ to $C_{10}$ alkyl, where at least one occurrence of $R^{49}$ is H. In a particular embodiment of the invention, the Si—H containing cyclotetrasiloxane is 1,3,5,7-tetramethylcyclotetrasiloxane.

Figure 3:
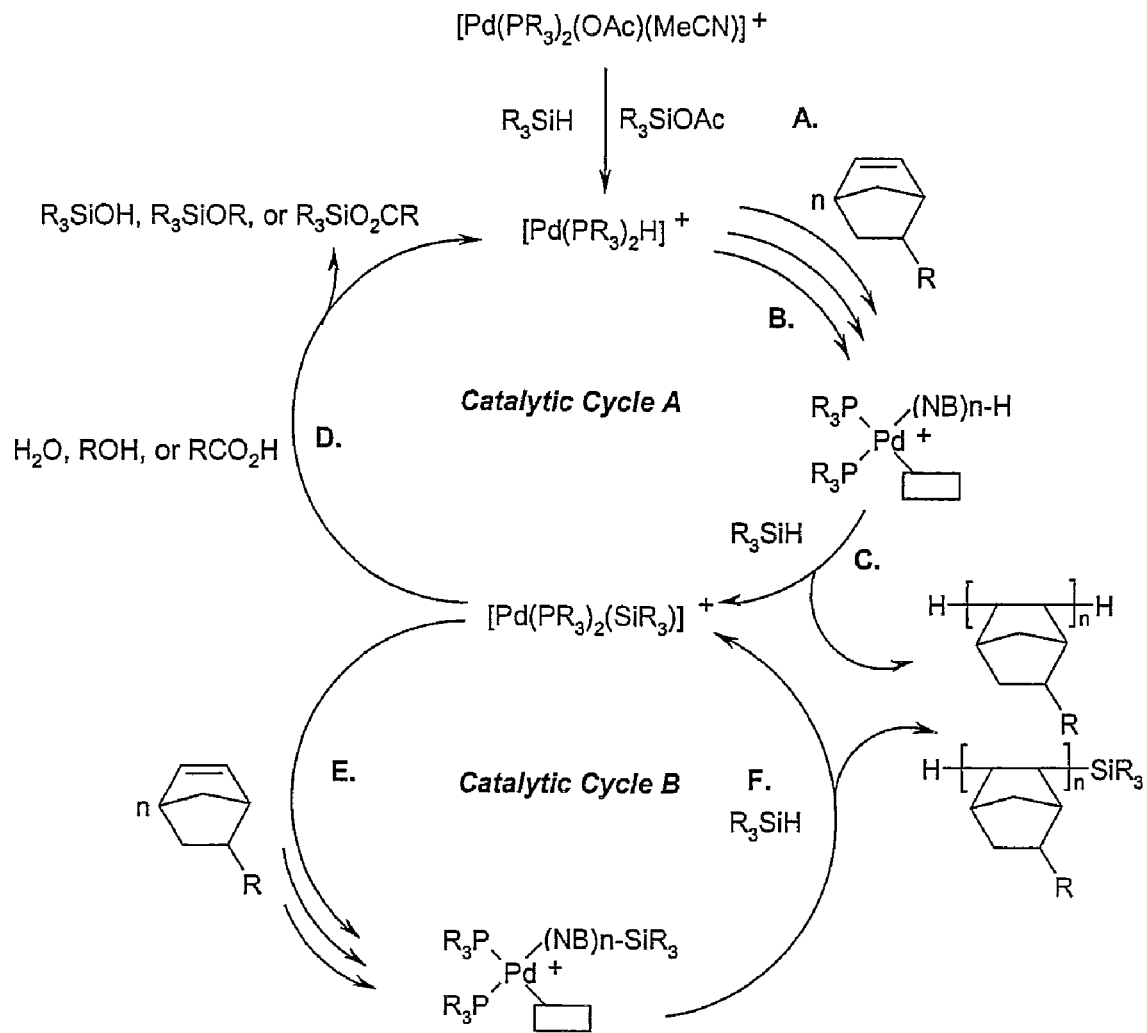
FIG. 3 shows a schematic of a polymerization mechanism of the present invention.

Not wishing to be bound to any particular theory, it is believed that the polymerization and chain transfer reaction proceed, at least in part, according to the scheme outlined in FIG. 3. As shown, the manner in which the silane is thought to react with a palladium procatalyst to create, in situ, a palladium hydride cation stabilized presumably by two phosphine ligands is illustrated (Step A). The norbornene monomer reacts with the palladium hydride cation by a coordination insertion mechanism to form a poly(norbornene) chain (Step B). An encounter during the polymerization of the palladium complex bearing the polymer chain with the silane chain transfer agent results in chain termination by a σ-bond metathesis reaction with the Si—H moiety of the silane. As a result, a hydrogen terminated norbornene polymer is formed concomitant with a palladium silane cationic complex (Step C). The palladium silane cationic complex is relatively unreactive toward further norbornene monomer insertion. However, in the presence of an activator compound containing an —OH group, this complex is transformed into a palladium hydride cation (Step D). Simultaneously, a silanol, silyl ether, or silyl ester is created, depending on whether the activator compound is water, an alcohol or a carboxylic acid, respectively. In this manner, the catalytically active species (the palladium hydride cation) is regenerated and the polymerization cycle repeats. See Catalytic Cycle A.

In the case where no activator compound is present in the reaction mixture, the palladium silane complex can contribute to the formation of poly(norbornene). See Catalytic Cycle B. The norbornene monomer reacts with the palladium hydride cation by a coordination insertion mechanism to form the poly(norbornene) chain (Step E). An encounter during the polymerization of the palladium complex bearing the polymer chain with the silane chain transfer agent results in chain termination by a σ-bond metathesis reaction with the Si—H moiety of the silane. As a result, a silane terminated norbornene polymer is formed concomitant with a palladium silane cationic complex (Step F).

The overall effect is a highly effective chain transfer process in which norbornene polymers are produced with end groups that are both essentially chemically benign and relatively transparent to imaging radiation (i.e. 193 nm and 157 nm).

The molecular weight of the resulting polymer is seemingly dependant upon the concentration of the silane chain transfer agent; that is to say that it is observed that the higher the silane concentration, the lower the molecular weight of the poly(norbornene). In contrast, the concentration of the activator compound does not seem to impact the molecular weight of the resulting polymer, but rather only seems to increase the activity of the catalyst species.

Figure 4:
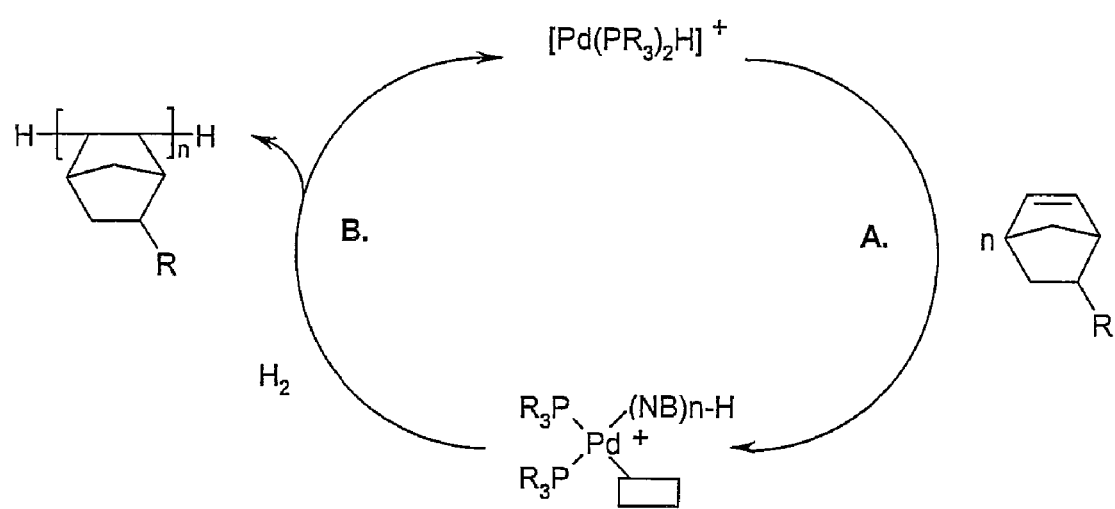
FIG. 4 shows another schematic of a polymerization mechanism of the present invention.

FIG. 4 illustrates the manner in which hydrogen ($H_2$) is thought to react with the norbornene polymer chain attached to a palladium cationic complex. As depicted, a hydrogen-terminated poly(norbornene) is formed by σ-bond metathesis of the Pd—C bond (Step A) in the poly(norbornene). Simultaneously, a palladium hydride cation is formed that can initiate a new poly(norbornene) chain (Step B).

The molecular weight of the poly(norbornene) is dependant upon the concentration of the hydrogen chain transfer agent; the higher the hydrogen concentration (i.e., pressure), the lower the molecular weight of the poly(norbornene).

Embodiments in accordance with the present invention include monomers represented by Formula (I). Particular embodiments of the invention are directed to monomers and polymers derived from monomers according to Formulae (I), (Ia), (II), or (III) as described below. Monomers according to Formula (I) are described by:

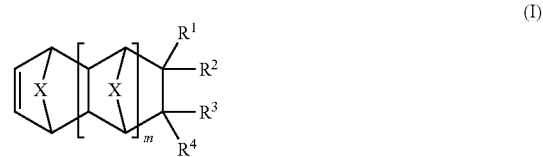

where X is selected from —$CH_2$—, —$CH_2$—$CH_2$, O, S, and —NH—; m is an integer from 0 to 5; and each occurrence of $R^1$, $R^2$, $R^3$ and $R^4$ is independently selected from one of the following groups:
a) H, halogen, linear, branched or cyclic $C_1$ to $C_{30}$ alkyl, aryl, aralkyl, alkaryl, alkenyl or alkynyl;
b) linear or branched $C_1$ to $C_{24}$ halohydrocarbyls, —($CH_2$)C(O)OR*, —($CH_2$)$_n$C(O)OR', —($CH_2$)$_n$OR, —($CH_2$)$_n$OC(O)R, —($CH_2$)$_n$C(O)R, —($CH_2$)—OC(O)OR', —($CH_2$)$_n$C(R)$_2$CH(R)(C(O)OR), —($CH_2$)$_n$($CR_2$)CH(R)(C(O)OR), —($CH_2$)$_n$C(OR***)($CF_3$)$_2$, —($CR''_2$)$_n$OR, —$CH_2$—[O($CH_2$)$_n$]$_{m*}$—C(OR*)($CF_3$)$_2$, —($CH_2$)$_n$C(R)$_2$CH(C(O)OR)$_2$, —($CH_2$)$_n$C(O)OH, —($CH_2$)$_n$C(R*)$_2$CH(R*)(C(O)OH), —($CH_2$)$_n$—C(O)—O—$R^{18}$, —($CH_2$)$_n$—C($CY_3$)$_2$—OH, and —($CH_2$)C(R*)$_2$CH(C(O)OH)$_2$; where each occurrence of R is independently selected from H and linear or branched $C_1$ to $C_{10}$ alkyl; R' is a linear or branched $C_1$ to $C_{10}$ alkyl or alkylol; R'' is selected from H and halogen; n and m* are each an integer from 0 to 10; R* represents an acid labile group cleavable by a photoacid generator; R** is selected from R' and R* as defined above and tertiary $C_4$ to $C_{20}$ linear or branched alkyl and cycloalkyl, $C_1$ to $C_6$ trialkylsilyl groups, and $C_4$ to $C_{20}$ oxoalkyl; R*** is selected from H, —$CH_2$OR''', —C(O)OR''' and —C(O)R''', where R''' is selected from methyl, ethyl, t-butyl, and $C_1$ to $C_{20}$ linear or branched cycloaliphatic, $R^{18}$ is selected from H, and linear, branched or cyclic $C_1$-$C_{24}$ alkyl, aryl, aralkyl, and alkaryl, Y is selected from F and Cl and at least one occurrence of Y is F;
c) $C_1$ to $C_{30}$ linear, branched, or cyclic alkyl, aryl, aralkyl, alkaryl, alkenyl or alkynyl containing one or more hetero atoms selected from O, N and Si;
d) a hydroxy alkyl ether according to Formula (IV):

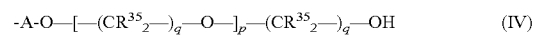

wherein A is a linking group selected from $C_1$ to $C_6$ linear, branched, or cyclic alkylene; each occurrence of $R^{35}$ is independently selected from H, methyl, ethyl and a halide; q is from 1 to 5, in some cases from 2 to 5; and p is from 0 to 3;

e) a group according to Formula (V):

$$-R^{36}-Z \quad (V)$$

where $R^{36}$ is a linear, branched or cyclic $C_1$ to $C_{30}$, optionally partially or completely halogenated, alkylene, arylene, aralkylene, alkarylene, alkenylene or alkynylene linking group and Z is a functional group selected from hydroxyl, carboxylic acid, amine, thiol, isocyanate and epoxy; and f) $C_rX''_{2r+1}$, wherein X" is independently a halogen selected from fluorine, chlorine, bromine or iodine and r is an integer from 1 to 20.

In an embodiment of the present invention, the monomer of Formula (I) includes acid labile substituent containing monomers. As used herein, an acid labile substituent or moiety is one that is readily cleavable by a photoacid generator. $R^1$ to $R^4$ are substituents independently selected from hydrogen, a halogen (i.e., fluorine, chlorine, bromine, and/or iodine), linear or branched ($C_1$ to $C_{30}$) alkyls, linear or branched ($C_1$ to $C_{24}$) halohydrocarbyls, linear or branched ($C_2$ to $C_{30}$) olefins; —$(CH_2)_nOC(O)R'$, —$(CH_2)_nC(O)OR^*$, —$(CH_2)_nC(O)OR'$, —$(CH_2)_nOR$, —$(CH_2)_nOC(O)R$, —$(CH_2)_nC(O)R$, —$(CH_2)_n$—$OC(O)OR'$, —$(CH_2)_nC(R)_2CH(R)(C(O)OR^{})$, —$(CH_2)_n(CR_2)_nCH(R)(C(O)OR^{})$, —$(CH_2)_nC(OR^{***})(CF_3)_2$, —$(CR''_2)_nOR$, —$CH_2$—$[O(CH_2)_n]_{m*}$—$C(OR^{*})(CF_3)_2$ and —$(CH_2)_nC(R)_2CH(C(O)OR^{})_2$. Within such substituents, R can be hydrogen or linear and branched ($C_1$ to $C_{10}$) alkyls; R' can be linear and branched ($C_1$ to $C_{10}$) alkyl or alkylol, R" can be hydrogen or a halogen (i.e., fluorine, chlorine, bromine, and/or iodine); n and m* are each an integer from 0 to 10; R* represents acid labile moieties (i.e., blocking or protecting groups), for example —$C(CH_3)_3$, —$Si(CH_3)_3$, isobornyl, 2-methyl-2-adamantyl, tetrahydrofuranyl, tetrahydropyranoyl, 3-oxocyclohexanonyl, mevalonic lactonyl, dicyclopropylmethyl (Dcpm), and dimethylcyclopropylmethyl (Dmcp) groups that are all exemplary acid labile substituents readily cleavable by photoacid generators; R** represents an independently selected R' or R*, where R' and R* are as defined above and R* further includes tertiary ($C_4$ to $C_{20}$) linear or branched alkyl and cycloalkyl groups, tri($C_1$ to $C_6$) alkylsilyl groups and oxoalkyl groups of 4 to 20 carbon atoms, exemplary tertiary alkyl groups that include, but are not limited to, tert-butyl, tert-amyl and 1,1-diethylpropyl, exemplary tertiary cycloalkyl groups that include, but are not limited to, 1-methylcyclopentyl, 1-ethylcyclopentyl, 1-butylcyclopentyl, 1-methylcyclohexyl, 1-ethylcyclohexyl, 1-butylcyclohexyl, 1-ethyl-2-cyclopentenyl, 1-ethyl-2-cyclohexenyl, 2-ethyl-2-adamantyl, exemplary trialkylsilyl groups that include, but are not limited to, trimethylsilyl, triethylsilyl and dimethyl-tert-butylsilyl and exemplary oxoalkyl groups that include, but are not limited to, 3-oxocyclohexyl, 4-methyl-2-oxooxan-4-yl, and 5-methyl-2-oxooxolan-5-yl; and R* includes hydrogen, —$CH_2OR'''$, —$(CH_2)_{n*}$—$C(O)OR'''$ or —$C(O)R'''$, where R''' can be methyl, ethyl, tert-butyl, cyclopentyl, cyclohexyl or other linear and branched cycloaliphatics and n*** is an integer from 0 to 3. The aforementioned Dcpm and Dmcp groups are respectively represented by the following structures:

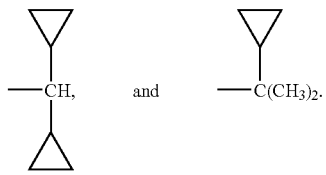

In some embodiments in accordance with the invention, at least one of $R^1$ to $R^4$ is either a halohydrocarbyl or a perhalocarbyl group. As used here and throughout the specification, the term halohydrocarbyl means that at least one hydrogen atom on the hydrocarbyl group, e.g., alkyl, alkenyl, alkynyl, cycloalkyl, aryl, and aralkyl groups, is replaced with a halogen atom selected from chlorine, bromine, iodine, fluorine and combinations thereof (e.g., haloalkyl, haloalkenyl, haloalkynyl, halocycloalkyl, haloaryl, and haloaralkyl). The halohydrocarbyl groups can contain 1 to 24 carbon atoms. The term fluorohydrocarbyl means that at least one hydrogen atom on the hydrocarbyl group is replaced by fluorine. The degree of halogenation can range from at least one hydrogen atom being replaced by a halogen atom (e.g., a monofluoromethyl group) to full halogenation (perhalogenation) wherein all hydrogen atoms on the hydrocarbyl group have been replaced by a halogen atom (e.g., perhalocarbyl such as trifluoromethyl (perfluoromethyl)). The fluorinated hydrocarbyl and perfluorocarbyl groups contain, in one embodiment, 1 to 24 carbon atoms. In some embodiments, the fluorinated hydrocarbyl and perfluorocarbyl groups contain 1 to 12 carbon atoms. In some embodiments, fluorinated hydrocarbyl and perfluorocarbyl groups contain 6 carbon atoms and can be linear or branched, cyclic, or aromatic. Such fluorinated hydrocarbyl and perfluorocarbyl groups include, but are not limited to, fluorinated and perfluorinated linear and branched $C_1$-$C_{24}$ alkyl, fluorinated and perfluorinated $C_3$-$C_{24}$ cycloalkyl, fluorinated and perfluorinated $C_2$-$C_{24}$ alkenyl, fluorinated and perfluorinated $C_3$-$C_{24}$ cycloalkenyl, fluorinated and perfluorinated $C_6$-$C_{24}$ aryl, and fluorinated and perfluorinated $C_7$-$C_{24}$ aralkyl. The fluorinated and perfluorocarbyl ether substituents are represented by the formulae —$(CH_2)_qOR^\dagger$ or —$(CF_2)_qOR^\dagger$ respectively, wherein $R^\dagger$ is a fluorinated hydrocarbyl or perfluorocarbyl group as defined above and q is an integer from 0 to 5.

In some embodiments in accordance with the present invention, the perhalohydrocarbyl groups include perhalogenated phenyl and alkyl groups. The halogenated alkyl groups useful in such embodiments are partially or fully halogenated and are linear or branched, and have the general formula $C_rX''_{2r+1}$ wherein X" is an independently selected halogen (fluorine, chlorine, bromine and iodine), and r is an integer from 1 to 20. In particular aspects of this embodiment, $R^1$ and $R^2$ can be hydrogen and $R^3$ and $R^4$ can be the structure $C_rX''_{2r+1}$ described above.

In some embodiments, the perfluorinated substituents include perfluorophenyl, perfluoromethyl, perfluoroethyl, perfluoropropyl, perfluorobutyl and perfluorohexyl. In addition to the halogen substituents, cycloalkyl, aryl and aralkyl groups of such embodiments can be further substituted with linear and branched $C_1$-$C_5$ alkyl and haloalkyl groups, aryl groups and cycloalkyl groups.

In particular embodiments of the invention, R** in the poly(cyclic)olefin monomer can be selected from tert-butyl, tert-amyl, 1,1-diethylpropyl, 1-methylcyclopentyl, 1-ethylcyclopentyl, 1-butylcyclopentyl, 1-methylcyclohexyl, 1-ethylcyclohexyl, 1-butylcyclohexyl, 1-ethyl-2-cyclopentenyl, 1-ethyl-2-cyclohexenyl, 2-ethyl-2-adamantyl, trimethylsilyl, triethylsilyl and dimethyl-tert-butylsilyl, 3-oxocyclohexyl, 4-methyl-2-oxooxan-4-yl, and 5-methyl-2-oxooxolan-5-yl. For some advantageous monomers in accordance with embodiments of the present invention, m in Formula (I) is 0, $R^1$ to $R^4$ and X are as previously defined. Non-limiting examples of such monomers include structures A, B, C, E, F, and H in FIG. 5.

Additional examples of monomers in accordance with embodiments of the invention where m=0 are such monomers where X is —$CH_2$—, $R^1$, $R^2$ and $R^3$ each are hydrogen and $R^4$ is either —$(CH_2)_t$—$C(OR^{*})$—$(CF_3)_2$, where $R^{*}$ is as previously defined, or —$(CH_2)_z$—$C(CF_3)_2$—O—$(CH_2)_z$—CO—$(OR^{\#})$, where each occurrence of z is independently an integer from 1 to 6 and $R^{\#}$ is $C_1$-$C_6$ linear or branched alkyl, in some instances t-butyl.

Other exemplary monomers in accordance with embodiments of the invention where m=0 and X is —$CH_2$—, $R^1$ and $R^2$ each are hydrogen and $R^3$ and $R^4$ each are $C_rX''_{2r+1}$ (where X'' is independently a halogen selected from fluorine, chlorine, bromine or iodine and r is an integer from 1 to 20).

In further embodiments of the invention, monomers where $R^1$ is the hydroxy alkyl ether according to Formula (IV), and $R^2$, $R^3$, and $R^4$ are each H in the poly(cyclic)olefin monomer. Additionally to this embodiment, in Formula (IV), A can be methylene or ethylene, each occurrence of $R^{35}$ can be H, q can be from 2 to 5, and p can be 0.

In some particular embodiments of the invention, the poly(cyclic)olefin monomer includes HFANB, 5-norbornene-2-methanol hydroxylethylether, t-butyl ester of norbornene 5-carboxylic acid, hydroxyethylester of 5-norbornene carboxylic acid, trimethylsilane ester of 5-norbornene carboxylic acid, 5-norbornene-2-methanol acetate, 5-norbornene-2-methanol, 5-norbornene-2-ethanol, 5-triethoxysilylnorbornene, 1-methylcyclopentyl ester of 5-norbornene carboxylic acid, tetrahydro-2-oxo-3-furanyl ester of 5-norbornene carboxylic acid and mixtures thereof.

It should be apparent to those skilled in the art that monomers having readily cleavable acid labile moieties, as defined above, are suitable for embodiments in accordance with the present invention only where the vinyl addition polymerization of such monomers is not substantially inhibited by such moieties.

Monomers according to Formula (II) are described by:

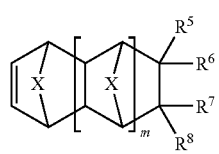

(II)

wherein m is an integer from 0 to 5 and each X is independently —$CH_2$—, —$CH_2$—$CH_2$—, O, S, or NH. In such monomers, $R^5$ to $R^8$ are each an independently selected neutral substituent selected from H, —$(CH_2)_n$—$C(O)OR''$, —$(CH_2)_n$—$OR'$, $Si(OR')_3$, —$(CB_2)_n$—$OC(O)R''$, —$(CH_2)_n$—$OC(O)OR''$, —$(CH_2)_n$—$C(O)R'$, —$(CH_2)_nC(R^*)_2CH(R^*)(C(O)OR^{**})$, —$(CH_2)_nC(R^*)_2CH(C(O)OR^{**})_2$, —$C(O)O$—$(CH_2)_n$—$OR'$ and —$(CH_2)_n$—O—$(CH_2)_n$—$OR'$, where n is independently an integer from 0 to 10, B can be hydrogen or a halogen (i.e., fluorine, chlorine, bromine, and/or iodine), $R^*$ can independently be hydrogen, a halogen such as fluorine, chlorine, bromine or iodine, a linear or branched ($C_1$ to $C_{10}$) alkyl group or cycloalkyl group or a linear or branched ($C_1$ to $C_{10}$) halogenated alkyl group or halogenated cycloalkyl group; R' can independently be hydrogen, a linear or branched ($C_1$ to $C_{10}$) alkyl group or cycloalkyl group or a linear or branched ($C_1$ to $C_{10}$) halogenated alkyl group or halogenated cycloalkyl group; $R^{**}$ is not readily cleavable by a photoacid generator and can independently be a linear or branched ($C_1$ to $C_{10}$) alkyl group or cycloalkyl group or a linear or branched ($C_1$ to $C_{10}$) halogenated alkyl group or halogenated cycloalkyl group; and R'' is not readily cleavable by a photoacid generator and can independently be linear or branched ($C_1$ to $C_{10}$) alkyls or halogenated alkyls, a monocyclic or polycyclic ($C_4$ to $C_{20}$) cycloaliphatic or halogenated cycloalkyl moiety, a cyclic ether, a cyclic ketone or a cyclic ester (lactone), where each of the cyclic ether, ketone and ester can be halogenated or not. Exemplary cycloaliphatic moieties include, but are not limited to, unsubstituted cyclopropyl, cyclobutyl, cyclopentyl and cyclohexyl groups, as well as 1-adamantyl and 1-norbornene moieties.

In some embodiments, at least one of $R^5$ to $R^8$ contains a halohydrocarbyl or perhalocarbyl group as defined above. The degree of halogenation can range from one hydrogen atom being replaced by a halogen atom to full halogenation (perhalogenation). For some advantageous monomers in accordance with embodiments of the present invention, m in Formula (II) is 0, $R^5$ to $R^8$ and X are as previously defined. Non-limiting examples of such monomers include structures B, C, D, E, G, and I in FIG. 5.

Monomers according to Formula (III) are described by:

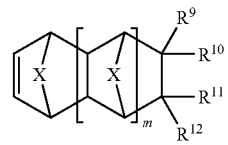

(III)

where m is an integer from 0 to 5, and X represents —$CH_2$—, —$CH_2$—$CH_2$—, O, S, or —NH—. At least one of $R^9$ to $R^{12}$ is an independently selected carboxylic acid substituent in accordance with one or more of the formulae —$(CH_2)_qC(O)OH$, —$(CH_2)_qC(R^{25})_2CH(R^{25})(C(O)OH)$ or —$(CH_2)_qC(R^{25})_2CH(C(O)OH)_2$ where q is an integer from 0 to 10 and $R^{25}$ can independently be hydrogen, a halogen such as fluorine, chlorine, bromine or iodine, a linear, branched, or cyclic ($C_1$ to $C_{10}$) alkyl group or cycloalkyl group or a linear or branched ($C_1$ to $C_{10}$) halogenated alkyl group or halogenated cycloalkyl group. Additionally, at least one of $R_9$ to $R_{12}$ can be a linear, branched, or cyclic ($C_1$ to $C_{10}$) alkyl group or cycloalkyl group containing one or more non-carboxylic acid substituents containing an active hydrogen having a pKa of about 15 or less. Those of $R^9$ to $R^{12}$ that are not a carboxylic acid substituent are independently selected from hydrogen and linear and branched ($C_1$ to $C_{10}$) alkyl or cycloalkyl groups as previously described with respect to $R^5$ to $R^8$.

For some advantageous monomers in accordance with embodiments of the present invention, m in Formula (III) is 0, $R^9$ to $R^{12}$ and X are as previously defined.

In an embodiment of the present invention, the groups $R^1$ to $R^4$ and $R^5$ to $R^8$ in the poly(cyclic)olefin monomers of Formula (I) and Formula (II) are independently selected such that three or more poly(cyclic)olefin monomers are included in the monomer composition. Additionally, the groups $R^1$ to $R^4$ and $R^9$ to $R^{12}$ in the poly(cyclic)olefin monomers of Formula (I) and Formula (III) are independently selected such that three or more poly(cyclic)olefin monomers are included in the monomer composition. Further, the groups $R^1$ to $R^4$, $R^5$ to $R^8$ and $R^9$ to $R^{12}$ in the poly(cyclic)olefin monomers of Formula (I), Formula (II) and Formula (III) are independently selected such that three or more poly(cyclic)olefin monomers are included in the monomer composition. The monomer composition can include any one or multiple variations of the poly(cyclic)olefin monomers of Formula (I), Formula (II) and Formula (III).

Embodiments in accordance with the present invention encompass homopolymers and polymers of monomers in accordance with any of Formulae (I), (Ia), (II), or (III) formed by vinyl addition polymerization using a catalyst containing a metal from Group 10 of the periodic table of the elements. In an embodiment of the invention, Ni or Pd containing catalysts, optionally an activator such as an alcohol as described above, and dihydrogen ($H_2$), alkyl and/or alkoxy substituted silanes, as described above, or other reagents that can undergo sigma bond metathesis reactions as chain transfer agents are used.

Figure 5:
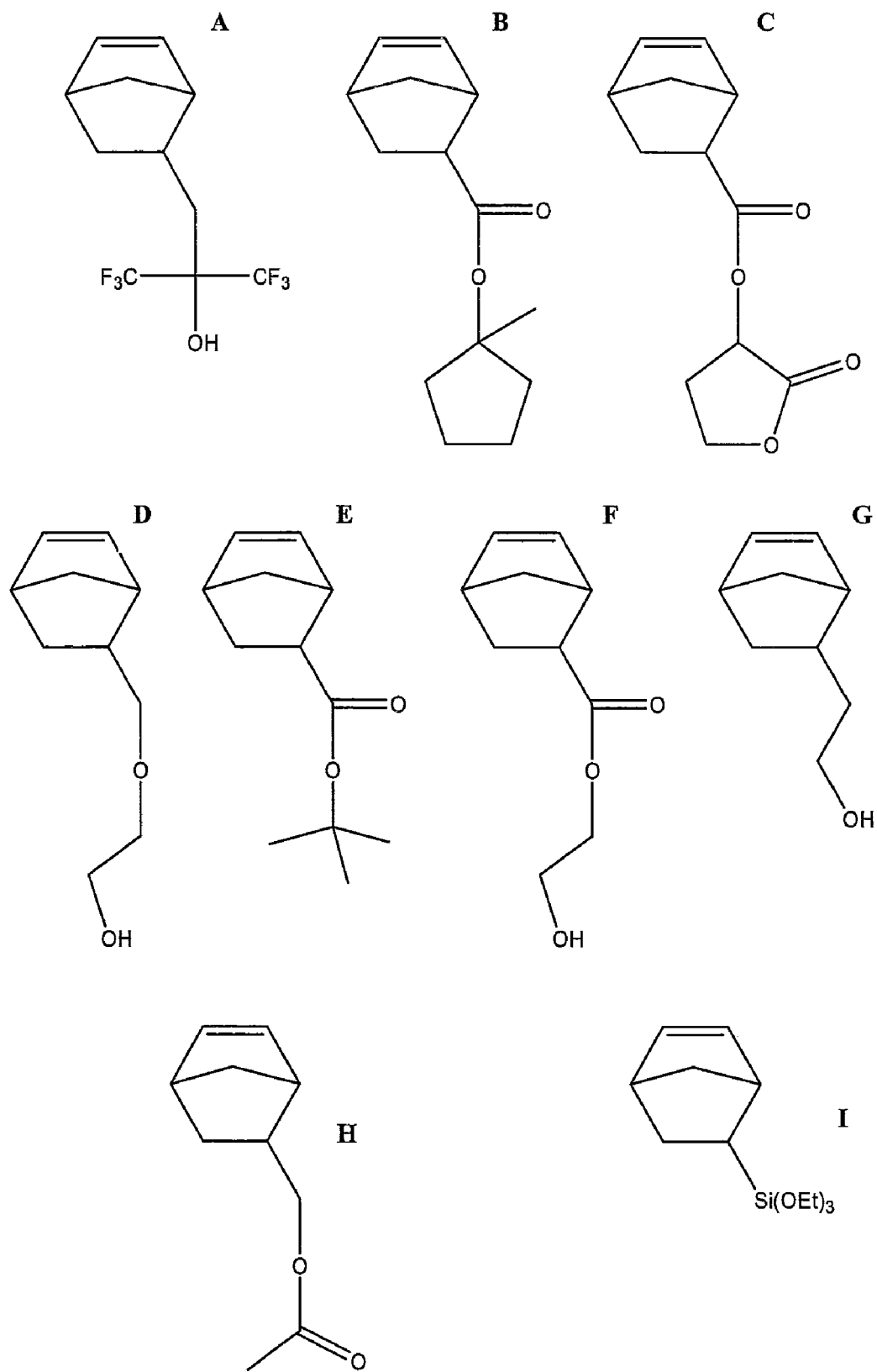
FIG. 5 shows structures of poly(cyclic)olefin monomers that can be used in the present invention.

In a particular embodiment of the invention, the poly(cyclic)olefin monomers used to make the polymers of the present invention include one or more of those shown in FIG. 5.

The polymers of the present invention are particularly useful in resist compositions and have a particularly low optical density (OD), especially at wavelengths of 193 nm and below.

Figure 6:
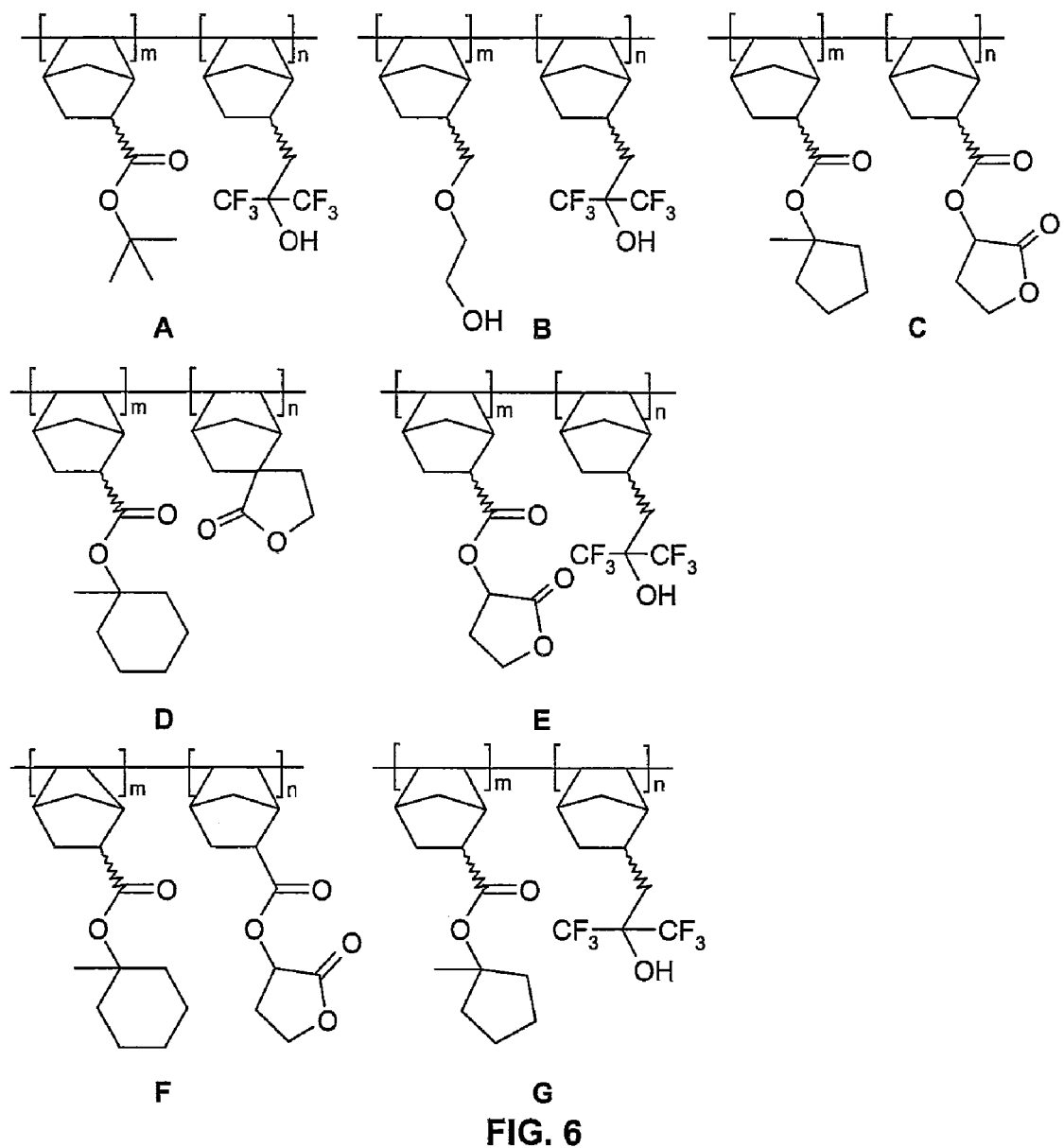
FIG. 6 shows exemplary polymers of the present invention.

Exemplary polymers of embodiments in accordance with the present invention include, but are not limited to, the structures depicted in Formulae A through G in FIG. 6. Other polymers in accordance with embodiments of the present invention include such polymers as can be formed from a monomer selected from each of Formulae (I), (Ia), (II), or (III) as depicted and described above.

An embodiment of the present invention is directed to an unsaturated monomer that can be used in the above-described polymerization method. The monomer includes those described above by Formula (Ia) where X and m are as described in Formula (I) and, $R^{13}$, $R^{14}$, $R^{15}$ and $R^{16}$ are as described above with the proviso that at least one of $R^{13}$, $R^{14}$, $R^{15}$ and $R^{16}$ includes the hydroxyalkylether of Formula (IVa):

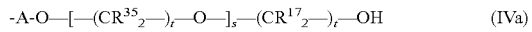  (IVa)

where A, $R^{17}$, $R^{35}$, t and s are as defined above. A non-limiting example of a monomer according to Formula (Ia) is structure D in FIG. 5.

A particular embodiment of the invention provides an ethylenically unsaturated monomer of Formula (Ia), where m=0, $R^{13}$ is the hydroxy alkyl ether according to Formula (IVa), and $R^{14}$, $R^{15}$ and $R^{16}$ are each H. In this embodiment, X can be methylene or ethylene, each occurrence of $R^{17}$ can be H, and s can be 0; all other variables are as defined above.

An additional embodiment of the invention provides a polymer including repeat units derived from monomers according to Formula (I), where each of $R^{13}$, $R^{14}$, $R^{15}$ and $R^{16}$ are independently selected from H and a group according to Formula (VI):

—$(CH_2)_n$—C(O)—O—$R^{18}$  (VI)

where $R^{18}$ is selected from H, and linear, branched or cyclic $C_1$-$C_{24}$ alkyl, aryl, aralkyl, and alkaryl and is free of hydroxy alkyl ether groups according to Formulae (IV) or (IVa). In a particular embodiment of the invention, $R^{18}$ can be t-butyl and m=0.

An exemplary embodiment of the invention provides a polymer as shown by structure B in FIG. 6, which includes repeat units of Formula (VII),

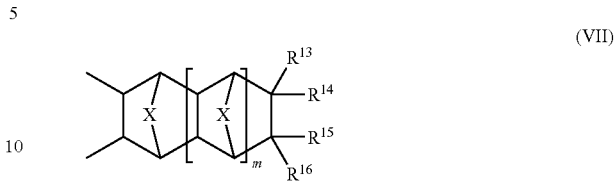  (VII)

where each of $R^{13}$, $R^{14}$, $R^{15}$ and $R^{16}$ are independently selected from H and a group according to Formula (IV) described above and Formula (VIII):

—$CH_2$—$C(CY_3)_2$—OH  (VIII)

where Y is selected from F and Cl and at least one occurrence of Y is F. A particular aspect of this embodiment is provided when each occurrence of Y is F and m=0.

In the present invention, a polymerization catalyst containing a metal from Group 10 of the periodic table of the elements, in some cases Ni and/or Pd, is added to the monomers causing the mixture to polymerize. In some embodiments of the invention, the catalyst is a single component procatalyst. In other embodiments of the invention, the polymerization catalyst includes a procatalyst and a co-catalyst.

Exemplary embodiments of the invention utilize palladium or nickel catalyst complexes. The palladium complexes are neutral and contain Group 15 ligands accompanied by salts of weakly coordinating anions as disclosed in U.S. Pat. No. 6,455,650, incorporated herein by reference. Other palladium complexes are cationic and are ligated by Group 15 ligands where a weakly coordinating anion is incorporated therein to balance any charge. Where nickel complexes are employed, such encompass an organonickel complex cation and a weakly coordinating counteranion. Exemplary cationic nickel complexes are described in U.S. Pat. No. 5,468,819, the pertinent parts of which are incorporated herein by reference. Other nickel complexes that are employed are neutral and contain electron withdrawing ligands. Exemplary neutral nickel complexes are described in U.S. Pat. No. 6,232,417, the pertinent parts of which are incorporated herein by reference.

Particular embodiments of the invention utilize one or more catalysts selected from trans-[Pd(NCMe)(OAc)(P(i-propyl)$_3$)$_2$]B($C_6F_5$)$_4$, trans-[Pd(NCC($CH_3$)$_3$)(OAc)(P(i-propyl)$_3$)$_2$]B($C_6F_5$)$_4$, trans-[Pd(OC($C_6H_5$)$_2$)(OAc)(P(i-propyl)$_3$)$_2$]B($C_6F_5$)$_4$, trans-[Pd(HOCH($CH_3$)$_2$)(OAc)(P(i-propyl)$_3$)$_2$]B($C_6F_5$)$_4$, trans-[Pd(NCMe)(OAc)(P(cyclohexyl)$_3$)$_2$]B($C_6F_5$)$_4$, Pd(OAc)$_2$(P(cyclohexyl)$_3$)$_2$, Pd(OAc)$_2$(P(i-propyl)$_3$)$_2$, Pd(OAc)$_2$(P(i-propyl)$_2$(phenyl))$_2$, trans-[Pd(NCMe)(OAc)(P(cyclohexyl)$_2$(t-butyl))$_2$]B($C_6F_5$)$_4$, and mixtures thereof.

In a particular embodiment of the invention, the catalyst complex is represented by:

[(E(R)$_3$)$_2$Pd(Q)$_2$]  (IX)

In another particular embodiment, the catalyst complex is represented by:

[(E(R)$_3$)$_2$Pd(Q)(LB)][WCA]  (X)

In Formulae (IX) and (X), E(R)$_3$ represents a Group 15 neutral electron donor ligand wherein E is selected from a Group 15 element of the Periodic Table of the Elements, and R independently represents hydrogen or an anionic hydrocarbyl containing moiety containing from 1 to 30, in some cases 1 to 10 carbon atoms; Q represents an anionic ligand selected from a carboxylate, thiocarboxylate, and dithiocarboxylate group that can contain from 1 to 30, in some cases 2 to 10 carbon atoms; LB represents a Lewis base; WCA represents a weakly coordinating anion. Where catalyst complexes in accordance with Formula (IX) are employed, salts of weakly coordinating anions are added. Where catalyst complexes in accordance with Formula (X) are employed, salts of weakly coordinating anions can be added to increase catalyst activity.

As used herein, the term "weakly coordinating anion" (WCA) refers to an anion which is generally only weakly coordinated to the palladium cation. It is sufficiently labile to be displaced by solvent or monomer. More specifically, the WCA anion functions as a stabilizing anion to the palladium cation and does not transfer to the cation to form a neutral product. The WCA anion is relatively inert in that it is non-oxidizing, non-reducing, and non-nucleophilic.

As stated herein, a neutral electron donor is any ligand which when removed from the palladium metal center in its closed shell electron configuration, has a neutral charge. Further, an anionic hydrocarbyl moiety is any hydrocarbyl group which when removed from the Group 15 element, E, in its closed shell electron configuration, has a negative charge. Additionally, a Lewis base is a donor of electron density (i.e., a pair of electrons).

In some embodiments in accordance with the present invention, E is selected from nitrogen, phosphorus, arsenic and antimony, and the anionic hydrocarbyl containing moiety, R, is independently selected from, but not limited to, linear and branched ($C_1$-$C_{20}$) alkyl, ($C_3$-$C_{12}$) cycloalkyl, ($C_2$-$C_{12}$) alkenyl, ($C_3$-$C_{12}$) cycloalkenyl, ($C_5$-$C_{20}$) polycycloalkyl, ($C_5$-$C_{20}$) polycycloalkenyl, and ($C_6$-$C_{12}$) aryl, and two or more R groups taken together with E can form a heterocyclic or heteropolycyclic ring containing 5 to 24 atoms. Representative heteroatoms in addition to those defined by E include, but are not limited to, oxygen and nitrogen.

Representative alkyl groups include, but are not limited to, methyl, ethyl, propyl, isopropyl, n-butyl, isobutyl, sec-butyl, tert-butyl, pentyl, and neopentyl. Representative alkenyl groups include, but are not limited to, vinyl, allyl, iso-propenyl, and iso-butenyl. Representative cycloalkyl groups include, but are not limited to, cyclopropyl, cyclobutyl, cyclopentyl, cyclohexyl, and cyclooctyl. Representative polycycloalkyl groups include, but are not limited to, norbornyl and adamantyl. Representative polycycloalkenyl groups include, but are not limited to, norbornenyl and adamantenyl. Representative aryl and aralkyl groups include, but are not limited to, phenyl, naphthyl and benzyl.

In an exemplary embodiment of the invention, the Group 15 neutral electron donor ligand is selected from a phosphine. Representative phosphine ligands include, but are not limited to trimethylphosphine, triethylphosphine, tri-n-propylphosphine, tri-isopropylphosphine, tri-n-butylphosphine, and tri-sec-butylphosphine Other suitable phosphine ligands are exemplified in U.S. Pat. No. 6,455,650, the pertinent portion of which is herein incorporated by reference.

It is to be recognized that the two phosphine groups can be taken together to form a diphosphine chelating ligand. Exemplary diphosphine chelating ligands include, but are not limited to, bis(dicyclohexylphosphino)methane; 1,2-bis(dicyclohexylphosphino)ethane; 1,3-bis(dicyclohexylphosphino) propane; 1,4-bis(dicyclohexylphosphino)butane; and 1,5-bis (dicyclohexylphosphino)pentane. Other suitable diphosphine ligands are exemplified in U.S. Pat. No. 6,455, 650, the pertinent portion of which is herein incorporated by reference.

The anionic carboxylate, thiocarboxylate and dithiocarboxylate ligands defined under Q in combination with the palladium metal center can be unidentate, symmetric bidentate, asymmetric chelating bidentate, asymmetric bridging or symmetric bridging ligands.

Lewis bases in accordance with the present invention can be any compound that donates an electron pair. The Lewis base can be water or selected from the following type of compounds: alkyl ethers, cyclic ethers, aliphatic or aromatic ketones, primary alcohols, nitriles, cyclic amines especially pyridines and pyrazines, and trialkyl or triaryl phosphites.

Exemplary Lewis base ligands include, but are not limited to, water, dimethyl ether, diethyl ether, tetrahydrofuran, dioxane, acetone, benzophenone, acetophenone, methanol, isopropanol, acetonitrile, benzonitrile, tert-butylnitrile, tert-butylisocyanide, xylylisocyanide, pyridine, dimethylaminopyridine, 2,6-dimethylpyridine, 4-dimethylaminopyridine, tetramethylpyridine, 4-methylpyridine, pyrazine, tetramethylpyrazine, triisopropylphosphite, triphenylphosphite, and triphenylphosphine oxide. Phosphines can also be included as exemplary Lewis bases so long as they are added to the reaction medium during the formation of the single component pro catalyst of the invention. Examples of Lewis base phosphines include, but are not limited to, triisopropylphosphine, tricyclohexylphosphine, tricyclopentylphosphine and triphenylphosphine.

The WCA of Formula (X) is selected from borates and aluminates, boratobenzene anions, carborane, halocarborane and phosphaborane anions. Representative borate anions include, but are not limited to, tetrakis(pentafluorophenyl) borate (FABA), tetrakis(3,5-bis(trifluoromethyl)phenyl)borate and tetrakis(2-fluorophenyl)borate. Other useful weakly coordinating anions, for example other borates and aluminates, boratobenzene anions, carborane, halocarborane and phosphaborane anions, can be found in U.S. Pat. No. 6,455, 650, the pertinent portions of which are incorporated herein by reference.

Exemplary salts of weakly coordinating anions are N,N-dimethylanilinium tetrakis(pentafluorophenyl)borate (DANFABA) and lithium tetrakis(pentafluorophenyl)borate 2.5 diethyletherate (LiFABA), among others.

In embodiments of the invention, the neutral nickel catalyst complex is represented by:

$$[LnNi(R^{ewg})_2] \quad (XI)$$

In Formula (XI), n is an integer of 0, 1, or 2. In Formula (XI), L is represented by a monodentate or bidentate ligand. Examples of monodentate ligands include, but are not limited to, π-arenes such as toluene, benzene and mesitylene; ethers such as tetrahydrofuran, dioxane, or diethylether; esters such as ethylacetate, methylacetate, or propylacetate. An example of a bidentate ligand is 1,2-dimethoxyethane.

In Formula (XI), $R^{ewg}$ is represented by an electron withdrawing ligand advantageously selected from perhaloalkyl, perhaloaryl and perhaloalkaryl ligands. Such perhaloalkyl ligands are selected from trifluoromethyl and perfluoroethyl; perhaloaryl ligands are selected from perfluorophenyl and perchlorophenyl; perhaloalkaryl ligands are selected from 2,4,5-tris(trifluoromethylphenyl).

Where n is 0, a representative neutral catalyst that contains no other ligands other than the electron withdrawing ligand is nickel(2,4,6-trifluoromethylphenyl)$_2$. Where n is 1, a representative neutral catalyst is nickel($\eta^6$-toluene)(pentafluorophenyl)$_2$. When n is 2, a representative neutral catalyst is nickel (tetrahydrofuran)$_2$(pentafluorophenyl)$_2$.

In some embodiments in accordance with the present invention, the cationic nickel catalyst complex is represented by:

$$[L'_yNiX_z]WCA \qquad (XII)$$

In Formula (XII), L' represents a ligand containing 1, 2, or 3 olefinic π bonds; X represents a ligand containing 1 Ni—C σ bond and between 0-3 olefinic π bonds; y is 0, 1, or 2 and z is 1 or 2 and wherein y and z cannot both be 0 at the same time.

In Formula (XII), L' represents a neutral ligand that is weakly coordinated to the nickel. In other words, the ligand is relatively inert and is readily displaced from the metal cation complex by the inserting monomer in the growing polymer chain. Suitable ligands include (C$_2$ to C$_{12}$) monoolefinic (e.g., 2,3-dimethyl-2-butene), diolefinic (C$_4$-C$_{12}$) (e.g., norbornadiene) and (C$_6$ to C$_{20}$) aromatic moieties. In some embodiments, ligand L' is a chelating bidentate cyclo(C$_6$ to C$_{12}$) diolefin, for example cyclooctadiene or dibenzo cyclooctadiene, or an aromatic compound such as benzene, toluene, or mesitylene; X is a single allyl ligand or a canonical fowl thereof, which provides a σ and a π bond; and WCA is a weakly coordinating anion as described above. Additional complexes in accordance with Formula (XII) include, but are not limited to, [(allyl)Ni(1,4-cyclooctadiene)]PF$_6$, [(crotyl) Ni(1,4-cyclooctadiene)]PF$_6$ and [(allyl)Ni(1,4-cyclooctadiene)]SbF$_6$.

Any suitable method can be used to remove metals from the polymers and compositions containing the polymers of the present invention. As a non-limiting example, the metals can be removed using carbon monoxide, in some cases in the presence of a protic solvent such as an alcohol, moisture, or a carboxylic acid. Such removal methods are disclosed in U.S. Pat. No. 6,136,499, in particular at col. 27, lines 30-45, Example 5 (col. 33, lines 1-35), 43 and 43A (col. 45, line 45 to col. 46, line 23), the relevant portions of which are herein incorporated by reference.

In an embodiment of the invention, the mixture including the monomer composition, the chain transfer agent and the activator compound is exposed to a temperature at which the above-described catalysts can effect polymerization of the monomers. In some embodiments of the invention, the temperature can be ambient temperatures and above. In a more particular embodiment, the mixture is heated to a temperature sufficient to effect polymerization, of at least 30° C., in some cases at least 75° C., and in other cases at least 125° C. In some instances, when the temperature is too low, polymerization is incomplete and/or too slow. Therefore, in some embodiments, the temperature employed is from about 100° C. to 250° C. or higher.

As previously discussed, embodiments of the invention are directed to positive tone and negative tone photoresist compositions. For negative tone photoresist compositions, certain types of polymers that include repeat units that are derived from monomers represented by Formula (I) can be used. Such polymers are referred to herein as negative tone imaging polymers and include polymers that encompass monomers according to Formula (I) that contain a functional group that is capable of being cured and/or crosslinking with another group that is reactive with the functional group of the negative tone imaging polymer (for example a functional group on a crosslinking agent). Suitable functional groups include, but are not limited to hydroxyl, carboxylic acid and epoxy groups.

In an embodiment of the invention, the negative tone imaging polymers include, but are not limited to polymers prepared using monomers according to Formula (I), where the functional groups in the negative tone imaging polymers are selected from a hydroxy alkyl ether according to Formula (IV), where A, R$^{35}$, q and p are as defined above; a group according to Formula (V), where R$^{36}$ and Z are as defined above; a group according to —(CH$_2$)$_n$—C(CY$_3$)$_2$—OH, where n and Y are as defined above; a group according to —(CH$_2$)$_n$C(O)OR* where n and R* are as defined above, and a —(CH$_2$)$_z$—C(CF$_3$)$_2$—O—(CH$_2$)$_z$—CO—(OR$^{\#}$) group, where z is an integer from 1 to 6 and R$^{\#}$ is C$_1$-C$_6$ linear or branched alkyl.

An embodiment of the present invention provides a negative tone photoresist composition including:
  A) a solvent;
  B) a photosensitive acid generator;
  C) a crosslinking agent containing functional groups; and
  D) one or more negative tone imaging polymers containing functional groups that are reactive with the functional groups in the crosslinking agent, the functional groups being those described above.

The negative tone photoresist compositions of the present invention have a particularly low optical density (OD), especially at wavelengths of 193 nm and below.

In an embodiment of the invention, the crosslinking agent (C) of the negative tone photoresist composition is a compound which is capable of reacting with functional groups, as a non-limiting example hydroxyl groups, of the polymer in (D). Further to this embodiment, the crosslinking agent (C) can be activated by an acid generated by the photoacid generator (B). Examples of suitable crosslinking agents that can be used in (C) include, but are not limited to, compounds containing one or more groups selected from methylol, alkoxyalkyl and carboxymethyl group substituted phenols; methylol, alkoxyalkyl and carboxymethyl group substituted cyclic ureas; methylol, alkoxyalkyl and carboxymethyl group substituted melamines; and methylol, alkoxyalkyl and carboxymethyl group substituted benzoguanine compounds.

In an additional embodiment of the present invention, the photoacid generator (B) is a compound that, upon exposure to radiation, generates a strong acid. Exemplary photoacid generators (B) that can be used in the invention include, but are not limited to, one or more compounds selected from triflates, pyrogallols, onium salts, hexafluoroarsenates, trifluoromethanesulfonates, esters of hydroxyimides, ad-bis-sulfonyl-diazomethanes, sulfonate esters of nitro-substituted benzyl alcohols and napthoquinone-4-diazides. In this embodiment, the triflates include triphenylsulfonium triflate; the pyrogallols include trimesylate of pyrogallol; and the onium salts include one or both of triarylsulfonium and diaryliodium hexafluoroantimonates.

An additional embodiment of the invention provides that the solvent (A) includes one or more solvents selected from propylene glycol methyl ether acetate, cyclohexanone, butyrolactate and ethyl lactate.

A comparison of the OD as a function of Mw of polymers made using olefinic chain transfer agents and the OD of polymers made using dihydrogen and triethylsilane as chain transfer agents as in the present invention is presented in FIG. 7 below. This figure shows data comparing the increase of OD as molecular weight decreases for polymers made using olefinic chain transfer agents with the OD of several polymers made using dihydrogen and triethylsilane non-olefinic chain transfer agents in accordance with embodiments of the present invention. It is readily apparent that polymers made using dihydrogen or triethylsilane as chain transfer agents give substantially lower ODs, and that the OD of these polymers is unrelated to molecular weight.

For positive tone photoresist compositions, another class of polymers that include repeat units that are derived from monomers represented by Formula (I) can be used. Such polymers are referred to herein as positive tone imaging polymers and include polymers that encompass monomers according to Formula (I) that contain a group that can be cleaved when exposed to radiation, rendering the polymer more soluble to a developer than the unexposed polymer.

An embodiment of the present invention provides a positive tone photoresist composition that includes the above-described positive tone imaging polymers. The positive tone resist compositions of the present invention have a particularly low optical density (OD), especially at wavelengths of 193 nm and below. The positive tone photoresist composition includes a solvent; a photosensitive acid generator; and one or more positive tone imaging polymers derived from poly(cyclic)olefin monomers, where the polymer contains a functional group containing moiety that contains a group that can be cleaved when exposed to radiation, rendering the polymer more soluble to a developer than the unexposed polymer.

Another embodiment of the invention is directed to a method of generating an image (positive or negative tone resist image) on a substrate. The method includes (a) coating a substrate with a film containing, as appropriate, the negative tone photoresist composition or positive tone photoresist composition described above to form a film; (b) imagewise exposing the film to radiation to form an image; and (c) developing the image. In an aspect of this embodiment, the substrate includes one or more of silicon, ceramics, and polymers. In a further aspect, the film is coated on the substrate in (a) using one or more methods selected from spin coating, spray coating, and doctor blading. Additionally, this embodiment can provide that before the film has been exposed to radiation in (b), the film is heated to from 90° C. to 150° C. for from 30 seconds to 5 minutes. Further, the film can be imagewise exposed from a radiation source selected from mercury lamps, mercury/xenon lamps, xenon lamps, argon fluoride lasers, krypton fluoride lasers, fluorine lasers, x-rays and electron beams. In a particular embodiment the film is imagewise exposed at a wavelength of from 90 nm to 514 nm.

In another embodiment, after the film has been exposed to radiation, the film can be heated to a temperature of from 90° C. to 150° C. for from 30 seconds to 5 minutes.

In a further embodiment, the negative tone image is developed with a non-aqueous solvent. Suitable solvents include, but are not limited to one or more solvents selected from propylene glycol methyl ether acetate, cyclohexanone, butyrolactate, and ethyl lactate.

An embodiment of the invention provides an integrated circuit assembly method encompassing (a) coating a substrate with appropriately the negative tone photoresist composition or positive tone photoresist composition described above to form a film; (b) imagewise exposing the film to radiation to four an image; (c) developing the image in the film where selected portions of the substrate are exposed; and (d) transferring the developed image to the substrate. Further, this embodiment extends to an integrated circuit chip, multichip module, or circuit board including the integrated circuit provided by the above-described method.

Suitable solvents that can be used to develop the present positive tone images include, but are not limited to an aqueous base, in many cases an aqueous base without metal ions such as tetramethyl ammonium hydroxide or choline. The composition of the present invention provides positive images with high contrast and straight walls. The dissolution property of the composition of the present invention can be varied by simply varying the composition of the polymer.

After the substrate has been exposed, circuit patterns can be formed in the exposed areas by coating the substrate with a conductive material such as conductive metals by art known techniques such as evaporation, sputtering, plating, chemical vapor deposition, or laser induced deposition. The surface of the film can be milled to remove any excess conductive material. Dielectric materials may also be deposited by similar means during the process of making circuits. Inorganic ions such as boron, phosphorous, or arsenic can be implanted in the substrate in the process for making p or n doped circuit transistors. Other means for forming circuits are well known to those skilled in the art.

The following examples are for illustrative purposes and are not intended to limit the invention in any way. Ratios of repeating units incorporated into the polymer backbones are given in molar weight percent.

EXAMPLES

Catalyst synthesis examples 1 to 5 illustrate the formation of some catalysts useful in embodiments of the present invention.

Catalyst Example 1 trans-[Pd(NCMe)(OAc)(P(i-propyl)$_3$)$_2$]B(C$_6$F$_5$)$_4$

A solution of LiB(C$_6$F$_5$)$_4$·(OEt$_2$)$_{2.5}$ (0.960 g, 1.10 mmol) and acetonitrile (10 mL, 191 mmol) was added dropwise to a stirring solution of trans-Pd(OAc)$_2$(P(I-propyl)$_3$)$_2$ (0.600 g, 1.10 mmol) and acetonitrile (20 mL, 383 mmol). The mixture was stirred for 4 hours, filtered through a 0.2 μm PTFE filter to remove the LiOAc by-product, and then concentrated by evaporation. The oily residue was washed with pentane (2×10 mL) and dried under reduced pressure to afford [trans-Pd(NCMe)(OAc)(P(i-propyl)$_3$)$_2$]B(C$_6$F$_5$)$_4$ (1.224 g, 93%) as a bright yellow solid. $^1$H NMR (δ, CD$_2$Cl$_2$): 1.38 (m, 36H, CH$_3$), 1.92 (s, 3H, CCH$_3$), 2.25 (m, 6H, CH(CH$_3$)$_2$), 2.42 (s, 3H, NCCH$_3$). $^{31}$P NMR 44.5 (s). Anal. Calcd for C$_{46}$H$_{48}$BF$_{20}$N$_{O2}$P$_2$Pd: C, 45.81; H, 4.01; P, 5.13. Found C, 46.19; H, 4.00; P, 5.26.

Catalyst Example 2 trans-[Pd(NCC(CH$_3$)$_3$)(OAc)(P(i-propyl)$_3$)$_2$]B(C$_6$F$_5$)$_4$

A solution of LiB(C$_6$F$_5$)$_4$·(OEt$_2$)$_{2.5}$ (0.960 g, 1.10 mmol) and trimethylacetonitrile (10.0 mL, 90.5 mmol) was added slowly over a 5 minute period to a stirring solution of trans-Pd(OAc)(P(i-propyl)$_3$)$_2$ (0.600 g, 1.10 mmol), CH$_2$Cl$_2$ (10 mL), and trimethylacetonitrile (5.0 mL, 45 mmol). The mixture was stirred for 4 hours and then filtered using a 0.2 μm PTFE filter to remove the LiOAc by-product and concentrated by evaporation. The resulting residue was dissolved in CH$_2$Cl$_2$ (10 mL), diluted with pentane (2 mL), and filtered a second time. Additional pentane (30 mL) was added to the orange solution causing the product to form an oil that was separated, washed with pentane (2×20 mL), and dried under reduced pressure to afford [trans-Pd(NCC(CH$_3$)$_3$)(OAc)(P(i-propyl)$_3$)$_2$]B(C$_6$F$_5$)$_4$(1.224 g, 91%) as a yellow/orange solid.

¹H NMR (CD$_2$Cl$_2$): 1.38 (m, 36H, CH$_3$), 1.40 (m, 6H, CH(CH$_3$)$_2$, 1.42 (s, 9H, NCC(CH$_3$)$_3$, 1.92 (s, 3H, CCH$_3$). ³¹P NMR 44.3 (s).

Catalyst Example 3 trans-[Pd(OC(C$_6$H$_5$)$_2$)(OAc)(P(i-propyl)$_3$)$_2$]B(C$_6$F$_5$)$_4$

A mixture of LiB(C$_6$F$_5$)$_4$·(OEt$_2$)$_{2.5}$ (0.960 g, 1.10 mmol) and CD$_2$Cl$_2$ (10 mL) was slowly added to a rapidly stirring solution of trans-Pd(OAc)$_2$)(P(i-propyl)$_3$)$_2$ (0.600 g, 1.10 mmol), benzophenone (3.34 g, 3.60 mmol), and CD$_2$Cl$_2$ (10 mL). The mixture was stirred for 4 hours and filtered through a 0.2 μm PTFE filter to remove the LiOAc by-product. The solution was then washed with H$_2$O (3×30 mL) and dried with MgSO$_4$. Pentane (30 mL) was added to the solution and the product separated. The resulting material was dissolved in CD$_2$Cl$_2$ (20 mL), washed with water (2×20 mL), filtered, and dried under reduced pressure to afford trans-Pd(OC(C$_6$H$_5$)$_2$) (OAc)(P(I-propyl)$_3$)$_2$]B(C$_6$F$_5$)$_4$ (0.95 g, 61%) as an orange solid. ¹H NMR (CD$_2$Cl$_2$): 1.39 (m, 36H, CH$_3$), 2.34 (s, 3H, CCH$_3$), 2.75 (m, 6H, CH(CH$_3$)$_2$, 7.47 (m, 4H, aryl), 7.58 (t, 2H, aryl), 7.80 (d, 4H, aryl). ³¹P NMR 47.03 (s).

Catalyst Example 4 trans-[Pd(HOCH(CH$_3$)$_2$)(OAc)(P(i-propyl)$_3$)$_2$]B(C$_6$F$_5$)$_4$

A solution of LiB(C$_6$F$_5$)$_4$·(OEt$_2$)$_{2.5}$ (0.960 g, 1.10 mmol) and 2-propanol (10.0 mL, 130 mmol) was added dropwise to a stirring solution of trans-Pd(OAc)$_2$(P(I-propyl)$_3$)$_2$ (1.00 g, 1.83 mmol), 2-propanol (20 mL, 260 mmol), and CD$_2$Cl$_2$ (15 ml). The mixture was stirred for 4 hours, filtered through a 0.2 μm PTFE filter to remove the LiOAc by-product, and then concentrated by evaporation. The oily residue was washed with pentane (2×10 mL) then dried under reduced pressure to afford [trans-Pd(HOCH(CH$_3$)$_2$)(P(i-propyl)$_3$)$_2$]B(C$_6$F$_5$)$_4$ (1.59 g, 71%) as a bright yellow solid. ¹H NMR (CD$_2$Cl$_2$): 1.38 (m, 36H, PCH(CH$_3$)$_2$, 1.97 (s, 3H, CCH$_3$), 2.90 (br s, 1H, HO 2.34 (m, 6H, PCH(CH$_3$)$_2$), 1.30 (d, 6H, OCH (CH$_3$)$_2$), 2.75 (m, 1H, OCH(CH$_3$)$_2$). ³¹P NMR 47.2 (s).

Catalyst Example 5 trans-[Pd(NCMe)(OAc)(P(cyclohexyl)$_3$)$_2$]B(C$_6$F$_5$)$_4$

A solution of LiB(C$_6$F$_5$)$_4$·(OEt$_2$)$_{2.5}$ (0.554 g, 637 mmol) and acetonitrile (10 mL, 191 mmol) was added dropwise to a stirring solution of trans-Pd(OAc)$_2$(PCy$_3$)$_2$ (0.500 g, 637 mmol) and acetonitrile (25.0 mL, 383 mmol). The yellow mixture was stirred for 4 hours, filtered through a 0.2 μm PTFE filter to remove the LiOAc by-product, and then concentrated by evaporation. The oily residue was washed with pentane (3×15 mL) and dried under reduced pressure to afford [trans-Pd(NCMe)(OAc)(PCy$_3$)$_2$]B(C$_6$F$_5$)$_4$ (0.85 g, 95%) as a bright yellow solid. ¹H NMR (CDCl$_3$): 1.12 (m, 12H, Cy), 1.28 (m, 12H, Cy), 1.55 (m, 12H, Cy), 1.69 (m, 6H, Cy), 1.86 (m, 24H, Cy), 1.90 (m, 3H, OAc), 2.43 (s, 3H, NCCH$_3$). ³¹P NMR 32.39 (s). Anal. Calcd for C$_{64}$H$_{72}$BF$_{20}$NO$_2$P$_2$Pd: C, 53.14; H, 5.02; P, 4.28. Found C, 53.61.19; H, 4.06; P, 3.89.

Catalyst Example 6

[Pd(NCMe)(OAc)(P(cyclohexyl)$_2$(t-butyl))$_2$]B(C$_6$F$_5$)$_4$

A solution of P(cyclohexyl)$_2$(t-butyl) (35.4 g, 155 mmol) in CH$_3$CN (100-mL) was added dropwise to a suspension of Pd(OAc)$_2$ (17.3 g, 77.3 mmol) in CH$_3$CN (400 mL) chilled to −78° C. After 10 minutes, the reddish brown mixture was warmed to room temperature with stirring. The solution turned orange and a yellow precipitate fowled. After stirring for 3 h, a solution of LiB(C$_6$F$_5$)$_4$·(OEt$_2$)$_{2.5}$ (67.3 g, 77.3 mmol) in CH$_3$CN (250 mL) was added. The suspension was stirred for 5 h, diluted with toluene (100 mL), and then filtered through a ¼ inch pad of Celite® filtering aid to remove the lithium acetate by-product. The yellow/orange filtrate was concentrated in vacuo to a golden syrup consistency, washed with a 1:5 v/v mixture of ether and pentane (2×−300 mL), pentane (2×300 mL), and concentrated using the rotary evaporator (35° C.). Pumping in vacuo for 24 h afforded [Pd(NCMe)(OAc)(P(cyclohexyl)$_2$(t-butyl))$_2$]B(C$_6$F$_5$)$_4$ (100 g, 71.7 mmole, 93%) as an amorphous yellow solid. ¹H NMR (acetone-d$_6$, 23° C.) δ 1.52 (m, 18H, —C(CH$_3$)$_3$, 1.36 (br s, 4H, -Cy), 1.52 (br s, 811, -Cy), 1.83 (br m, 4H, -Cy), 2.25 (br m, 4H, -Cy), 2.26 (s, 3H, —O2CCH$_3$), 2.47 (br m, 2H, -Cy), 2.94 (s, 3H, NCCH$_3$) ppm. ³¹P NMR (acetone-d$_6$, 23° C.) δ 48.21 ppm (s). IR (KBr) 2935, 2856, 1643, 1514, 1465, 1373, 1274, 1086, 980, 775 cm-1. Analytical Data Calc'd for C$_{60}$H$_{68}$BF$_{20}$NO$_2$P$_2$Pd: C, 51.68; H, 4.92; P, 4.44; N, 1.0. Found: C, 51.69; H, 4.78; P, 3.60; N, 0.82.

Polymer Synthesis Examples

For the following examples, unless specifically noted otherwise, the molecular weight of the resulting polymer, where reported, was determined using GPC methods in THF with a poly(styrene) standard. Further, it should be noted that the examples are presented in such a manner as to illustrate the effect of the non-olefinic chain transfer agents and/or activator materials on the resulting polymers. Therefore, for ease of illustration and understanding of these effects, Examples 1-82 are directed to the forming a homopolymer. While such homopolymers can be useful, Examples 85-109 are directed to polymers that encompass more than one type of repeat units. Such polymers are useful in positive tone and negative tone embodiments of the present invention.

Synthesis Examples 1-5

The following examples illustrate the change in molecular weight (Mw) of a resulting homopolymer of α,α-bis(trifluoromethyl)bicyclo[2.2.1]hept-5-ene-2-ethanol (HFANB) changes as a function of the amount of triethylsilane chain transfer agent employed.

Synthesis Example 1

Toluene (171 mL), HFANB (100 g, 365 mmol), ethanol (2.30 mL, 40.5 mmol), and triethylsilane (5.80 mL, 36.5 mmol, 9 mol percent of the monomer used) were placed into a vial equipped with a TEFLON® coated stirbar and sealed with a septum cap. The mixture was sparged with nitrogen for 15 min then heated to 80° C. Once temperature was reached, Catalyst Example 1 (44.0 mg, 0.0365 mmol) dissolved in 1.5 mL of dichloroethane and N,N-dimethylanilinium tetrakis (pentafluorophenyl)borate ((DANFABA) 88.0 mg, 0.110 mmol) dissolved in 1.5 mL of dichloroethane were both injected into the monomer reaction mixture. The mixture was stirred for 18 h. The mixture was then cooled to room temperature and poured into a hexane to precipitate the polymer, filtered, and dried in a vacuum oven for 24 h at 100° C. Yield 76.5 g (77%). Mw=5350; Mn=3270.

Synthesis Examples 2-5

The method of Example 1 was repeated in each of Examples 2-5, except that the amount of triethylsilane was changed as indicated in Table 1 along with the resulting yields, molecular weights, and optical densities of the polymer films at 193 nm. It should be observed that the polymer's molecular weight is inversely proportional to the mol % of triethylsilane employed.

TABLE 1

Effect of triethylsilane concentration on HFANB homopolymer molecular weight in the presence of ethanol

| Example | Mol % $Et_3SiH$ | Mol % EtOH | Yield (%) | Mw | Mn | Mw/Mn | Optical Density (193 nm) |
|---|---|---|---|---|---|---|---|
| 1 | 9 | 10 | 77 | 5,350 | 3,270 | 1.64 | 0.05 |
| 2 | 5 | 10 | 87 | 9,000 | 5,100 | 1.77 | 0.07 |
| 3 | 3 | 10 | 89 | 15,700 | 7,490 | 2.10 | 0.05 |
| 4 | 2 | 10 | 91 | 22,700 | 10,600 | 2.15 | 0.07 |
| 5 | 1.5 | 10 | 93 | 31,900 | 13,700 | 2.32 | 0.06 |

Synthesis Examples 6-14

Ethanol as Activator of Polymerization Activity

The following examples show that as the ratio of monomer to catalysts increases the molecular weight and yield remains reasonably constant.

Synthesis Example 6

In the drybox, HFANB (10.97 g, 0.04000 mol), ethanol (0.20 g, 0.0044 mol), triethylsilane (0.46 g, 0.0040 mol, 9 mol percent of the monomer used), 1.5 mL of a 0.0032 M solution of DANFABA in methylene chloride were placed into a vial equipped with a TEFLON® coated stirbar. The total volume was increased to 27 mL by the addition of toluene and the vial was sealed with a septum cap. The mixture was heated to 80° C. Once temperature was reached, 1.5 mL of a 0.0016 M solution of Catalyst Example 1 in methylene chloride was added to the monomer reaction mixture. The mixture was stirred for 17 h. The mixture was then cooled to room temperature and poured into hexane to precipitate the polymer, filtered, and dried in a vacuum oven at 80° C. Yield 8.12 g (74%). The activity of the palladium catalyst was determined by dividing the number of grams of polymer isolated by the number of grams of palladium employed in the reaction.

Synthesis Examples 7-14

Ethanol as Activator of Polymerization Activity

The procedure of Example 6 was repeated except that the amounts of catalyst and DANFABA used were changed as indicated by the ratio of monomer to catalyst to WCA shown in Table 2. The resulting yields, molecular weights, and catalyst activities of these experiments are listed in Table 2.

TABLE 2

Effect of decreasing catalyst loading on polymerization activity, polymer yield, and molecular weight

| Ex. | Mol % $Et_3SiH$ | Mol % EtOH | Monomer:Pd: $[Me_2NHPh]$ $[B(C_6F_5)_4]$ | Yield (%) | Mw | Mn | Mw/Mn | Activity (g/g Pd) |
|---|---|---|---|---|---|---|---|---|
| 6 | 9 | 10 | 20k:1:3 | 74 | — | — | — | 38500 |
| 7 | 9 | 10 | 25k:1:3 | 75 | — | — | — | 48800 |
| 8 | 9 | 10 | 30k:1:3 | 72 | 4890 | 3300 | 1.48 | 56300 |
| 9 | 9 | 10 | 40k:1:3 | 72 | — | — | — | 74900 |
| 10 | 9 | 10 | 50k:1:3 | 72 | — | — | — | 93900 |
| 11 | 9 | 10 | 60k:1:3 | 71 | 4950 | 3390 | 1.46 | 111000 |
| 12 | 9 | 10 | 80k:1:3 | 64 | 4800 | 3250 | 1.47 | 133000 |
| 13 | 9 | 10 | 100k:1:3 | 52 | — | — | — | 134000 |
| 14 | 9 | 10 | 200k:1:3 | 43 | — | — | — | 222000 |

Synthesis Example 15

Water as Activator

Synthesis Example 11 was repeated except that instead of ethanol, water (0.080 g, 0.0044 mol) was added to the reaction mixture. The resulting yields and molecular weights of this example are given in Table 3 and show that they are essentially identical to that from experiment 11.

TABLE 3

Comparison of ethanol and water as activators for HFANB homopolymerization

| Example No. | Mol % $Et_3SiH$ | Mol % ROH | Monomer:Pd: $[Me_2NHPh]$ $[B(C_6F_5)_4]$ | Yield (%) | Mw | Mn | Mw/Mn |
|---|---|---|---|---|---|---|---|
| 11 | 9 | 10 (R = Et) | 60k:1:3 | 71 | 4950 | 3390 | 1.46 |
| 15 | 9 | 10 (R = H) | 60k:1:3 | 70 | 4850 | 3280 | 1.48 |

Synthesis Example 16

Comparative Example

Synthesis Example 11 was repeated except that no ethanol was added to the reaction mixture. Results in Table 4 show that without ethanol as an activator under these conditions the yield of polymer is essentially zero.

TABLE 4

Comparison of polymerization of HFANB in the presence and absence of ethanol

| Example No. | Mol % $Et_3SiH$ | Mol % EtOH | Monomer:Pd: $[Me_2NHPh]$ $[B(C_6F_5)_4]$ | Yield (%) | Mw | Mn | Mw/Mn |
|---|---|---|---|---|---|---|---|
| 11 | 9 | 10 | 60k:1:3 | 71 | 4950 | 3390 | 1.46 |
| 16 | 9 | 0 | 60k:1:3 | <1 | — | — | — |

Synthesis Examples 17-19

Synthesis Example 11 was repeated except that the palladium catalysts, [Pd(L)(acetate)(tri-isopropyl)$_2$]tetrakispentafluorophenylborate with different Lewis bases, L=acetonitrile, benzophenone, isopropanol, and t-butylnitrile, were used. The resulting yields and molecular weights from these examples are given in Table 5.

TABLE 5

Polymerization of HFANB in the presence of triethylsilane and ethanol with different palladium catalysts

| Ex. | Cat. | Lewis Base L | Mol % Et₃SiH | Mol % EtOH | Monomer:Pd: [Me₂NHPh] [B(C₆F₅)₄] | Yield (%) | Mw | Mn | Mw/Mn |
|---|---|---|---|---|---|---|---|---|---|
| 11 | 1 | MeCN | 9 | 10 | 60k:1:3 | 71 | 4950 | 3390 | 1.46 |
| 17 | 3 | Ph₂CO | 9 | 10 | 60k:1:3 | 71 | 4790 | 3300 | 1.45 |
| 18 | 4 | iPrOH | 9 | 10 | 60k:1:3 | 73 | 4850 | 3300 | 1.47 |
| 19 | 2 | tBuCN | 9 | 10 | 60k:1:3 | 73 | 4750 | 3280 | 1.48 |

Synthesis Example 20

In the drybox, HFANB (8.23 g, 0.0300 mol), 0.0048 g of DANFABA (0.00600 mmol), and 0.520 g of tri-1-propylsilane (3.33 mmol) were placed into a vial equipped with a TEFLON® coated stirbar. The total volume was increased to 20 mL by the addition of toluene and the vial was sealed with a septum cap. The mixture was heated to 80° C. Once temperature was reached, 0.5 mL of a 0.0024 M solution of Pd(acetate)₂(tricyclohexylphosphine)₂ in toluene was added to the monomer reaction mixture. The mixture was stirred for 18 h. After polymerization the reaction mixture was cooled. An unstirrable polymeric gel resulted. The yield was assumed to be high. Mw=943000; Mn=322000.

Synthesis Example 21

The example was repeated except that an increased amount of tri-1-propylsilane (4.75 g, 30.1 mmol) was used. The mixture was stirred for 18 h. After polymerization the reaction mixture was cooled. An unstirrable polymeric gel resulted. The yield was assumed to be high. Mw=166000; Mn=41300. The examples demonstrate that tri-I-propylsilane works as a chain transfer agent.

Synthesis Example 22-24

In the drybox, HFANB (8.23 g, 0.0300 mol), 0.0481 g of DANFABA (0.0600 mmol), and 0.100 g of tripropylsilane (0.631 mmol, 2.1 mol percent of the monomer used) were placed into a vial equipped with a TEFLON® coated stirbar. The total volume was increased to 20 mL by the addition of toluene and the vial was sealed with a septum cap. The mixture was heated to 80° C. Once temperature was reached, 1.0 mL of a 0.012 M solution of Pd(acetate)₂(tricyclohexylphosphine)₂ in toluene was added to the monomer reaction mixture. The mixture was stirred for 18 h. After polymerization the reaction mixture was cooled. An unstirrable polymeric gel resulted. The yield was assumed to be high. Mw=26300; Mn=11800.

The example was repeated but increasing amounts of tripropylsilane was used (5 and 10 mol percent). After polymerization, the reaction mixture was cooled and poured into hexane to precipitate the polymer. The polymer was filtered and dried in a vacuum oven at 80° C. Yields were determined gravimetrically. The resulting yields and molecular weights are presented in Table 7.

TABLE 7

Polymerization of HFANB in the presence of increasing amount of tri-n-propylsilane

| Example | Tripropylsilane (mol %) | Yield (%) | Mw | Mn | Mw/Mn |
|---|---|---|---|---|---|
| 22 | 2 | Puck* | 26300 | 11800 | 2.23 |
| 23 | 5 | 80 | 8760 | 5060 | 1.73 |
| 24 | 10 | 54 | 5770 | 3700 | 1.56 |

*unstirrable polymer gel, yield assumed to be high

Synthesis Example 25

In the drybox, HFANB (8.23 g, 0.0300 mol), 0.0481 g of DANFABA (0.0600 mmol), and 1.08 g of pentamethyldisiloxane (7.50 mmol, 20 mol percent of the monomer used) were placed into a vial equipped with a TEFLON® coated stirbar. The total volume was increased to 20 mL by the addition of toluene and the vial was sealed with a septum cap. The mixture was heated to 80° C. Once temperature was reached, 1.0 mL of a 0.012 M solution of Pd(acetate)₂(tricyclohexylphosphine)₂ in toluene was added to the monomer reaction mixture. The mixture was stirred for 18 h. After polymerization the reaction mixture was cooled and poured into hexane to precipitate the polymer. The polymer was filtered and dried in a vacuum oven at 80° C. Yield 2.13 g (26%). Mw=110000; Mn=33200.

Synthesis Example 26

HFANB (5.00 g, 0.0182 mol) is weighed into a glass vial and combined with 1.8 mL of a stock solution of DANFABA (0.0032 g, 0.0040 mmol in 2 mL of toluene). To this solution is added 7 mL of toluene. The mixture heated to 80° C. for one hour. To this mixture is added 0.7 mL of a stock solution of trans-bis(di-isopropylphenylphosphine)palladium diacetate (0.0012 g, 0.0020 mmol in 2 mL of toluene). The mixture is stirred for 18 h. Thereafter, the polymer is precipitated by pouring the reaction mixture into heptane. The precipitated polymer is filtered and dried at 100° C. in a vacuum oven. Yield 4.58 g (92%). Mw=1,500,000; Mn=660,000. Results for this example are summarized in Table 8.

Synthesis Examples 27-28

HFANB (5.00 g, 0.0182 mol) is weighed into a glass vial and combined with 1.8 mL of a stock solution of DANFABA (0.0032 g, 0.0040 mmol in 2 mL of toluene). To this solution is added 7 mL of toluene. The mixture is added to a glass pressure vessel and charged with hydrogen gas to 20 psig and heated to 80° C. for one hour. To this mixture is added 0.7 mL of a stock solution of trans-bis(di-isopropylphenylphosphine) palladium diacetate (0.0012 g, 0.0020 mmol in 2-mL of toluene). The mixture is stirred for 18 h. Thereafter, the polymer is precipitated by pouring the reaction mixture into heptane. The precipitated polymer is filtered and dried at 100° C. in a vacuum oven. Yield 4.32 g (86%). Mw=22,900; Mn=9900.

This example was repeated, but at 30 psig pressure of hydrogen. The resulting yields and molecular weights are presented in Table 8. Optical density measurements are given in Table 8.

Synthesis Example 29

HFANB (80.0 g, 0.292 mol) is weighed into a glass vial and combined with DANFABA (0.0468 g, 0.0584 mmol). To this solution was added sufficient toluene to make a total reaction mixture of 200 mL. The mixture was added to a glass pressure vessel and charged with hydrogen gas to 50 psig and heated to 80° C. The hydrogen gas was relieved and to this mixture was added 0.0071 g of trans-bis(di-isopropylphenylphosphine) palladium diacetate (0.0116 mmol) in toluene. The mixture was stirred for 18 h. Thereafter, the polymer was precipitated by pouring the reaction mixture into heptane. The precipitated polymer was filtered and dried at 100° C. in a vacuum oven. Yield 60.6 g (76%). Mw=13600; Mn=5700. The results are summarized in Table 8.

Synthesis Example 30

Example 29 was repeated but with increased pressure of hydrogen (90 psig). The resulting yields and molecular weights are presented in Table 8. Optical density measurements are also given in Table 8.

TABLE 8

Polymerization of HFANB in the presence of increasing hydrogen pressure

| Example | $H_2$ Pressure | Yield | Mw | Mn | Mw/Mn | Optical Density (193 nm) |
|---|---|---|---|---|---|---|
| 26 | 0 psig | 92% | 1,500,000 | 660000 | 2.27 | 0.10 |
| 27 | 20 psig | 89% | 22900 | 9900 | 2.32 | 0.04 |
| 28 | 30 psig | 86% | 18100 | 8450 | 2.15 | 0.03 |
| 29 | 50 psig | 76% | 13500 | 5700 | 2.37 | 0.03 |
| 30 | 90 psig | 70% | 12200 | 6630 | 1.84 | 0.02 |

Figure 7:
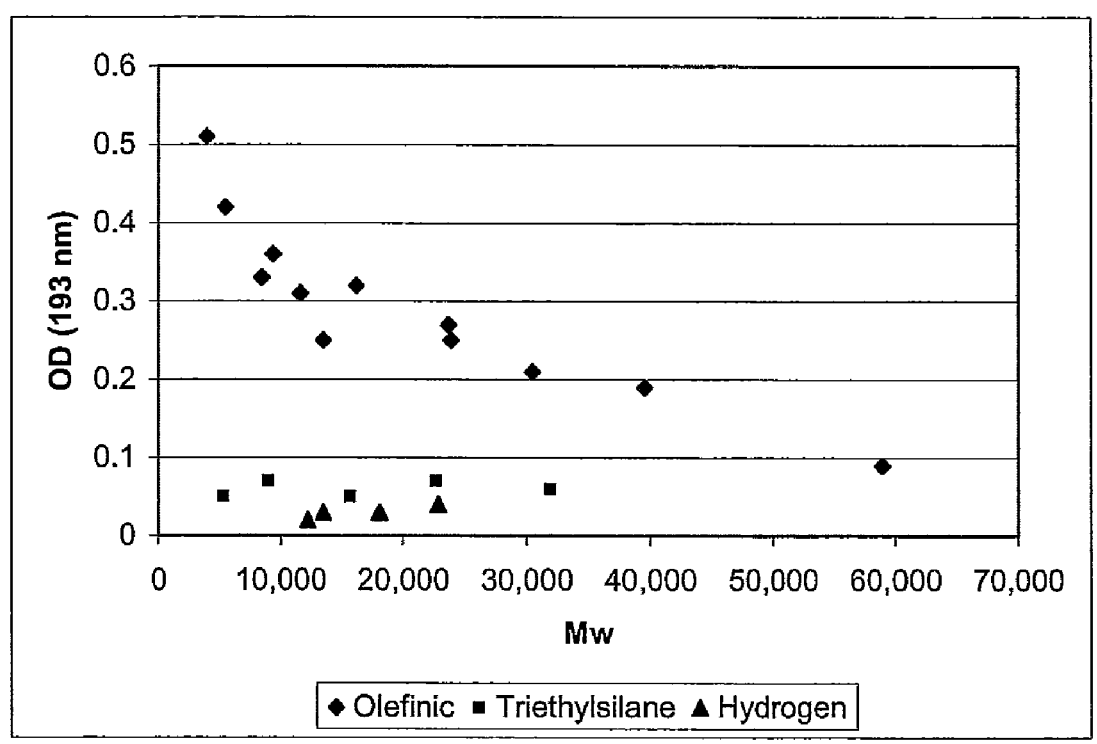
FIG. 7 shows a plot of optical density versus weight average molecular weight for HFANB homopolymers.

The molecular weight (Mw) and optical density (OD) results for Examples 27-30 are plotted in FIG. 7.

Synthesis Examples 31-34

In the drybox, HFANB (10.97 g, 0.04000 mol), ethanol (0.10 g, 0.0021 mol, 5 mole percent of the monomer used), triethylsilane (0.46 g, 0.0040 mol, 9 mol percent of the monomer used), 1.0 mL of a 0.002 M solution of DANFABA in methylene chloride were placed into a vial equipped with a TEFLON® coated stirbar. The total volume was increased to 27 mL by the addition of toluene and the vial was sealed with a septum cap. The mixture was heated to 80° C. Once temperature was reached, 1.0 mL of a 0.000663 M solution of Catalyst Example 1 in methylene chloride was added to the monomer reaction mixture. The mixture was stirred for 18 h. The mixture was then cooled to room temperature and poured into a hexane to precipitate the polymer which was filtered, and dried in a vacuum oven at 80° C. Yield 5.53 g (50%). This experiment was repeated with increasing concentrations of ethanol. Results in Table 9 apparently show that the optimum amount of ethanol needed to optimize yield is between 10 and 15 mole percent. These data also confirm that the concentration of ethanol does not substantially affect the molecular weight of the polymer.

TABLE 9

Homopolymerization of HFANB with increasing concentration of ethanol

| | Example 31 | Example 32 | Example 33 | Example 34 |
|---|---|---|---|---|
| Mol % Ethanol | 5 | 10 | 15 | 20 |
| Yield | 50% | 73% | 73% | 51% |
| Mw | 5150 | 4470 | 4940 | 5720 |

Synthesis Examples 35-42

In the drybox, HFANB (10.97 g, 0.04000 mol), methanol (0.14 g, 0.0043 mol, 10 mole percent of the monomer used) and triethylsilane (0.46 g, 0.0040 mol, 9 mole percent of the monomer used), 1.0 mL of a 0.002 M solution of DANFABA in methylene chloride were placed into a vial equipped with a TEFLON® coated stirbar. The total volume was increased to 27 mL by the addition of toluene and the vial was sealed with a septum cap. The mixture was heated to 80° C. Once temperature was reached, 1.0 mL of a 0.000663 M solution of Catalyst Example 1 in methylene chloride was added to the monomer reaction mixture. The mixture was stirred for 17 h. The mixture was then cooled to room temperature and poured into a hexane to precipitate the polymer, which was filtered and dried in a vacuum oven at 80° C. Yield 7.05 g (64%). This experiment was repeated using different alcohols: n-propanol, i-propanol, t-butanol, phenol, 2,2,3,4,4,4-hexafluoro-1-butanol, 1,1,1,3,3,3-hexafluoro-2-propanol, and 1,1,1,3,3,3-hexafluoro-2-methyl-2-propanol. The resulting isolated yields and Mws are presented in Table 10. All hydroxyl containing additives increase the yield above what is observed in the absence of such additives (Comparative Example 16).

TABLE 10

Homopolymerization of HFANB with different alcohols at 10 mole percent concentration

| Example | Alcohol (10 mole percent) | Yield | Mw |
|---|---|---|---|
| 35 | Methanol | 64 | 5130 |
| 36 | n-Propanol | 70 | 4800 |
| 37 | i-Propanol | 66 | 4720 |
| 38 | t-Butanol | 44 | 5670 |
| 39 | Phenol | 55 | 4890 |
| 40 | 2,2,3,4,4,4-hexafluoro-1-butanol | 13 | — |
| 41 | 1,1,1,3,3,3-hexafluoro-2-propanol | 10 | — |
| 42 | 1,1,1,3,3,3-hexafluoro-2-methyl-2-propanol | 3 | — |

Synthesis Examples 43-45

A comparison of different Pd catalysts for HFANB homopolymerization was made using triethylsilane and ethanol. The polymerizations were carried out as in Synthesis Example 11 and the results are shown in Table 11. All experiments were carried out in toluene with 10 mol percent triethylsilane and ethanol.

TABLE 11

| Example | Catalyst | Monomer:Cat: DAN FABA | Yield | Mw | Mn |
|---|---|---|---|---|---|
| 43 | [Pd(MeCN)(OAc)(PiPr$_3$)$_2$]FABA | 10K:1:3 | 78% | 4690 | 3200 |
| 44 | Pd(OAc)$_2$(PiPr$_3$)$_2$ | 10K:1:3 | 51% | 5090 | 3550 |
| 45 | Pd(OAc)$_2$(PiPr$_3$)$_2$ | 10K:1:5 | 55% | 5150 | 3490 |

Synthesis Examples 46-57

Polymerizations were run as in Synthesis Example 11 except that different ROH activators were used in a HFANB polymerization. All experiments were run at 60K:1:3 HFANB:Pd-1206:DANFABA in toluene for 18 h at 80° C. at 1.5 M monomer concentration and 9 mol percent triethylsilane. The results are shown in Table 12.

TABLE 12

| Example | ROH | Mol % ROH | Yield (%) | Mw | Mn |
|---|---|---|---|---|---|
| 46 | H$_2$O | 5 | 77 | 4810 | 3300 |
| 47 | H$_2$O | 10 | 75 | 4610 | 3170 |
| 48 | H$_2$O | 15 | 76 | 4580 | 3090 |
| 49 | H$_2$O | 20 | 77 | 4650 | 3150 |
| 50 | tBuOH | 5 | 42 | 5520 | 3920 |
| 51 | tBuOH | 10 | 44 | 5710 | 4050 |
| 52 | tBuOH | 15 | 42 | 5940 | 4190 |
| 53 | tBuOH | 20 | 39 | 6450 | 4420 |
| 54 | PhOH | 5 | 36 | 5450 | 3700 |
| 55 | PhOH | 10 | 55 | 4890 | 3450 |
| 56 | PhOH | 15 | 55 | 4700 | 3220 |
| 57 | PhOH | 20 | 68 | 4730 | 3280 |

The results show that the HFANB polymerization using this catalyst system is not impacted by large amounts of water. The yield also is not affected by the concentration of tBuOH. For PhOH, higher concentration seems to be better. For all of these Examples, the molecular weight of the polymer is essentially the same.

Synthesis Examples 58-61

Polymerizations were run as in Synthesis Example 11 evaluating a diol, ethylene glycol (EG), as an activator. The results demonstrating the effect of the EG activator are shown in Table 13 and compared with examples using no alcohol activator and using ethanol as activator.

TABLE 13

| Example No. | Mole % ROH | Yield (%) |
|---|---|---|
| 16 | 0 | <1 |
| ROH = Ethanol | | |
| 45 | 5 | 50 |
| 46 | 10 | 73 |
| 47 | 15 | 73 |
| 48 | 20 | 51 |
| ROH = Ethylene Glycol | | |
| 81 | 5 | 77 |
| 82 | 10 | 86 |
| 83 | 15 | 84 |
| 84 | 20 | 57 |

As observed with ethanol, the effect of ethylene glycol as measured by yield seems to reach a maximum and then fall as the concentration approaches 20 mole percent. However, the ethylene glycol seems to increase the yield by about 10%, possibly due to the additional hydroxyl group.

Synthesis Examples 62-66

The monomer, HFANB (100 g, 365 mmol), triethylsilane (5.80 mL, 36.1 mmol), ethanol (2.30 mL, 40.5 mmol), and sufficient toluene to make a 1.5 M solution of monomer were added to a glass reactor equipped with a stirbar. The solution was sparged with nitrogen for 15 minutes. The reactor was heated to 80° C. in an oil bath. Catalyst 1 (0.044 g, 36.5 mmol) in about 1.5 mL of dichloroethane and DANFABA (0.0880 g, 110 mmol) in about 1.5 mL of dichloroethane were added to the reactor. The reaction was allowed to continue for 18 hours. The mixture was allowed to cool to room temperature. The mixture was added to heptane (10-fold excess). The precipitated polymer was filtered and dried in a vacuum oven for 18 hours at 100° C. Yield 84.5 g (89%).

This experiment was repeated at different amounts of triethylsilane. The results of these experiments are given in Table 14 below.

TABLE 14

| Example | Et$_3$SiH (mol %) | Mw | Mn | Mw/Mn | OD (193 nm) |
|---|---|---|---|---|---|
| 62 | 9 | 5350 | 3270 | 1.64 | 0.05 |
| 63 | 5 | 9030 | 5070 | 1.78 | 0.07 |
| 64 | 3 | 15700 | 7490 | 2.10 | 0.05 |
| 65 | 2 | 22700 | 10600 | 2.15 | 0.07 |
| 66 | 1.5 | 31900 | 13700 | 2.32 | 0.06 |

The OD and Mw data are plotted in FIG. 7. These polymers exhibit very low OD at 193 nm. The OD values are independent of molecular weight.

Synthesis Examples 67-70

These examples demonstrate the use of alkylalkoxysilane-type compounds as chain transfer agents. Synthesis Example 11 was repeated but instead of triethylsilane, increasing amounts of tetrakis(dimethylsiloxy)silane (A) or 1,3,5,7-tetramethylcyclotetrasiloxane (B) was used. Results are presented in Table 15 below.

TABLE 15

| Example | Silane | Yield | Mw | Mw/Mn |
|---|---|---|---|---|
| 67 | A (1%) | 95% | 13300 | 1.99 |
| 68 | A (2%) | 94% | 5970 | 1.62 |
| 69 | B (1%) | 97% | 10800 | 2.03 |
| 70 | B (2%) | 94% | 5690 | 1.78 |

Synthesis Example 71

This example demonstrates the use of acetic acid as an activator in the present method. Synthesis Example 11 was repeated except that instead of ethanol, an equivalent molar amount of acetic acid was employed. The polymerization yield was 3.37 g (31%).

Synthesis Example 72

A 20 ml vial was charged with HFANB (2.6 g, 8.7 mmol), 1,2-dichloroethane (9.0 ml), Et$_3$SiH (0.50 µL, 3.2 µmol) and a TEFLON® coated magnetic stirbar. The mixture was stirred 1 min and then [(η³-crotyl)nickel(1,4-cyclooctadiene)]PF₆ (0.064, 0.17 mmol) was added directly to the mixture. The vial was capped and the orange solution was stirred for 12 hours at ambient temperature. The mixture was opened to air and diluted with 1,2-dichloroethane (10 mL). The polymer was precipitated by dropwise addition to rapidly stirring hexanes (100 mL) and isolated by filtration. The resulting polymer was air-dried 3 hours and then for 15 h at 65° C. in vacuo to afford 1.3 g (54%). The molecular weights were Mw=23400 and Mn=12200 as determined by GPC techniques.

Synthesis Example 73

A 20 ml vial was charged with HFANB (2.6 g, 8.7 mmol), 1,2-dichloroethane (9.0 ml), Et₃SiH (1.0 µL, 6.3 µmol) and a TEFLON® coated magnetic stirbar. The mixture was stirred 1 min and then [(η³-crotyl)nickel(1,4-cyclooctadiene)]PF₆ (0.064, 0.17 mmol) was added directly to the mixture. The vial was capped and the orange solution was stirred for 12 hours at ambient temperature. The mixture was opened to air and diluted with 1,2-dichloroethane (10 mL) The polymer was precipitated by dropwise addition to rapidly stirring hexanes (100 mL) and isolated by filtration. The resulting polymer was air-dried 3 hours and then for 15 h at 65° C. in vacuo to afford 1.1 g (46%). The molecular weights were Mw=9590 and Mn=5180 as determined by GPC techniques.

Synthesis Example 74

Synthesis Example 11 was repeated but 5-norbornene-2-methanol acetate (MeOAcNB) (6.65 g, 0.0400 mol) was used instead of HFANB. The mixture was stirred for 20 h. The mixture was then cooled to room temperature and poured into heptane to precipitate the polymer, filtered, and dried in a vacuum oven at 80° C. Yield 5.33 g (85%). Mw=3390; Mn=1580.

Synthesis Example 75

Homopolymerization of MeOAcNB using ethanol-d₁. The above experiment was repeated, except ethanol-d₁ was used instead of ethanol. Yield 5.25 g (79%). Mw=3640; Mn=1840.

Synthesis Example 76

Homopolymerization of MeOAcNB using triethylsilane-d₁. The above experiment was repeated, except triethylsilane-d₁ was used instead of triethylsilane and ethanol was used instead of ethanol-d₁. Yield 5.66 g (85%). Mw=4360; Mn=1710.

Synthesis Example 77

Homopolymerization of MeOAcNB using triethylsilane-d₁ and ethanol-d₁. The above experiment was repeated, except ethanol-d₁ was used instead of ethanol. Yield 5.53 g (83%). Mw=4440; Mn=1820.

Synthesis Example 78

These Examples show the incorporation of deuterium label into the polymers from Synthesis Examples 85-88. The polymers from examples 85-88 were subjected to matrix assisted laser desorption ionization time-of-flight mass spectrometry (MALDI-TOF MS) analysis in a matrix of dithranol doped with sodium trifluoroacetate using a Bruker Reflex III instrument in the positive ion mode. The results of the spectra are consistent with the following structures:

Example 74: H-(5-norbornene-2-methanol acetate)$_n$-H
Example 75: D-(5-norbornene-2-methanol acetate)$_n$-H
Example 76: H-(5-norbornene-2-methanol acetate)$_n$-D
Example 77 D-(5-norbornene-2-methanol acetate)$_n$-D Synthesis Example 74 was repeated except that no ethanol was added. Yield 4.60 g (69%). Mw=6570; Mn=2580.

In the MALDI-TOF MS spectrum of this example, there is a minor series (<10% of the total) that is consistent with the following structure which is not present in the spectra of the other samples:

H-(5-norbornene-2-methanol acetate)$_n$-SiEt₃

Approximately 90% of the remaining signals exhibited a series in the MALDI-TOF MS spectrum consistent with the following structure:

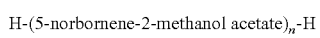

H-(5-norbornene-2-methanol acetate)$_n$-H

These data support the notion that hydrogens in HSiEt₃ and EtOH are responsible for the hydrogen end groups in the polymers as depicted in Catalytic Cycle A of FIG. 3. In addition, these data support the idea that in the absence of an effective amount of activator compound containing —OH groups, some, albeit a small amount, of the polymer is initiated by a palladium silane cationic species as depicted in Catalytic Cycle B in FIG. 3.

Synthesis Examples 79-82

A mixture of norbornene (4.8 g, 0.051 mol) in 1,2-dichloroethane was added to a vial. The mixture was sparged with nitrogen for 10 min. To this mixture was added [(η³-crotyl)Ni(1,4-cyclooctadiene)]PF₆ (19.0 mg, 0.051 mmol). The mixture was stirred at room temperature for 4 h. The mixture was added to methanol (100 mL) to precipitate the polymer. The polymer was isolated by filtration and then dried in a vacuum oven at 65° C. overnight. Yield 4.31 g (90%). Mw=525,000 and Mw/Mn=5.73 as determined by GPC techniques in THF/cyclohexane.

The above reaction was repeated but in the presence of increasing amounts of triethylsilane. The results are presented in Table 16.

TABLE 16

| Homopolymerization of norbornene | | | | |
| --- | --- | --- | --- | --- |
| Example No. | Mol. % of triethylsilane | Conversion Percentage | Mw | Mw/Mn |
| 114 | 0 | 90 | 525000 | 5.73 |
| 115 | 2 | 92 | 312000 | 2.87 |
| 116 | 5 | 90 | 175000 | 3.31 |
| 117 | 8 | 98 | 144000 | 3.51 |

Synthesis Example 83

Synthesis of 5-norbornene-2-ethanol

In a 300 mL autoclave equipped with a thermal couple and a mechanical stirrer, a mixture of 4-butenol (89.1 g, 1.27 mol) and dicyclopentadiene (40.8 g, 0.310 mol) was stirred and heated to 190° C. The reaction was cooled after 4.5 h. The mixture was distilled using a short-path distillation column under vacuum at 70° C. at 500 mTorr. The distillate was further purified chromatographically on silica gel column using ethyl acetate/cyclohexane (2/98 v/v) as eluent. After the solvent was removed under vacuum, the pure monomer remained. Yield 20 g (47%). $^1$H NMR (500 MHz, CDCl$_3$): Endo isomer: 6.13 (m, 1H); 5.92 (m, 1H); 3.63 (t, 214); 2.77 (s, 2H); 2.10 (m, 1H); 1.87 (m, 1H); 1.41 (d, 2H), 1.24 (d, 2H), 0.55 (d of t, 1H). Exo isomer: 6.08 (m, 1H); 6.02 (m, 1H); 3.70 (t, 2H); 2.80 (s, 1H); 2.54 (s, 1H); 1.65 (m, 2H); 1.45 (m, 2H); 1.27 (m, partially obscured by endo isomer, 1H); 1.25 (m, partially obscured by endo isomer, 1H); 1.11 (d of t, 1H). Endo/exo ratio by $^1$H NMR was determined to be 80/20.

Synthesis Example 84

Synthesis of 5-norbornene-2-methanol hydroxylethyl ether

In a 300 mL autoclave equipped with a thermal couple and a mechanical stirrer, a mixture of 2-allyloxyethanol (109.5 g, 1.07 mol) and dicyclopentadiene (35.4 g, 0.27 mol) was stirred and heated to 190° C. The reaction was cooled after 3 h. Three such reactions were run and the reaction mixtures were combined. The mixture was distilled using a short-path distillation column under vacuum at 70° C. at 500 mTorr. The distillate (170 g) was dissolved in a mixture of 250 mL of CH$_3$OH and 150 mL of H$_2$O. Hexane (3×125 mL) was added to the mixture in order to extract out cyclopentadiene impurities. To the remaining methanol/water solution NaCl was added to force the product to oil out from solution. Ethyl acetate (200 mL) was added to extract the oil from water. After the solvents were removed by rotovaporation the product was dried under vacuum. Yield 157 g (58%). $^1$H NMR (500 MHz, CDCl$_3$): Endo isomer: 6.13 (m, 1H); 5.93 (m, 1H); 3.72 (t, 2H); 3.52 (m, 2H); 3.22 (t, 1H); 3.10 (t, 1H); 2.90 (s, 1H); 2.80 (s, 1H); 2.37 (m, 1H); 2.09 (br s, 1H); 1.82 (m, 1H); 1.43 (d, 1H), 1.26 (d, 1H), 0.50 (d of t, 1H). Exo isomer: 6.10 (m, 1H); 6.07 (m, 1H); 3.75 (t, 2H); 3.36 (m, 2H); 3.50 (t, 1H); 3.40 (t, 1H); 2.80 (s, 1H); 2.74 (s, 1H); 2.09 (br s, 1H); 1.71 (m, 1H); 1.33 (d, 1H), 1.30 (d, 1H); 1.24 (m, partially obscured by endo isomer, 1H); 1.11 (d of t, 1H). Endo/exo ratio by $^1$H NMR was determined to be 82/18.

Synthesis Examples 85-88

In a drybox HFANB (7.07 g, 0.0258 mol), t-butyl ester of norbornene 5-carboxylic acid (0.82 g, 0.0042 mol) and 0.0523 g of lithium tetrakis(pentafluorophenyl)borate.2.5 diethyletherate (0.0600 mmol) were placed into a vial equipped with a TEFLON® coated stirbar. The total volume was increased to 20 mL by the addition of toluene and the vial was sealed with a septum cap. The mixture was heated to 80° C. Once temperature was reached, 1.0 mL of a 0.012 M solution of Pd(acetate)$_2$(tricyclohexylphosphine)$_2$ in toluene was added to the monomer reaction mixture. The mixture was stirred for 18 h. After polymerization, the reaction mixture was cooled and poured into hexane to precipitate the polymer. The polymer was filtered and dried in a vacuum oven at 80° C. Yields were determined gravimetrically. Yield>64% (some polymer was lost during workup). Mw=392000; Mn=242000.

The example was repeated except that increasing mole percentages of triethylsilane (2, 5 and 10 mol percent) based on the monomer used was added to the monomer mixture. The resulting yields, molecular weights, and optical density (absorbance/micron) at 193 nm are presented in Table 17.

TABLE 17

Polymerization of HFANB and t-butyl ester of 5-norbornene carboxylic acid in the presence of increasing amount of triethylsilane

| Example | Mol % triethylsilane | Yield (%) | Mw | Mn | Mw/Mn | Optical Density (193 nm) |
|---|---|---|---|---|---|---|
| 85 | 0 | >64* | 392000 | 242000 | 1.62 | — |
| 86 | 2 | >84* | 30900 | 10500 | 2.94 | — |
| 87 | 5 | 89 | 9650 | 4770 | 2.02 | — |
| 88 | 10 | 87 | 4480 | 3090 | 1.45 | 0.18 |

*some polymer was lost during workup

Synthesis Examples 89-92

In the drybox, HFANB (7.07 g, 0.0258 mol), 5-norbornene-2-methanol hydroxyethyl ether (0.71 g, 0.0042 mol) and 0.0481 g of DANFABA (0.0600 mmol) were placed into a vial equipped with a TEFLON® coated stirbar. The total volume was increased to 20 mL by the addition of toluene and propylene glycol methyl ether (90:10 volumetric ratio) and the vial was sealed with a septum cap. The mixture was heated to 80° C. Once temperature was reached, 1.0 mL of a 0.012 M solution of Pd(acetate)$_2$(tricyclohexylphosphine)$_2$ in toluene was added to the monomer reaction mixture. The mixture was stirred for 18 h. After polymerization, the reaction mixture was cooled. An unstirrable polymeric gel resulted. The yield was assumed to be high. The polymer molecular weight was determined by GPC methods in THF using poly(styrene) as a standard. Mw=354000; Mn=122000.

The example was repeated except that increasing mole percent of triethylsilane (2, 5 and 10 mol percent) based on the monomer used was added to the monomer mixture. After polymerization, the reaction mixture was cooled and poured into hexane to precipitate the polymer. The polymer was filtered and dried in a vacuum oven at 80° C. Yields were determined gravimetrically. The resulting yields, molecular weights, and optical density (absorbance/micron) at 193 nm are presented in Table 18.

TABLE 18

Polymerization of HFANB and 5-norbornene-2-methanol hydroxyethyl ether in the presence of increasing amount of triethylsilane

| Example | Triethylsilane (mol %) | Yield (%) | Mw | Mn | Mw/Mn | OD (193 nm) |
|---|---|---|---|---|---|---|
| 89 | 0 | Puck* | 354000 | 122000 | 2.90 | — |
| 90 | 2 | 98 | 17300 | 8450 | 2.05 | — |
| 91 | 5 | 96 | 8450 | 4600 | 1.84 | — |
| 92 | 10 | 79 | 4450 | 2950 | 1.51 | 0.13 |

*unstirrable polymer gel, yield assumed to be high

Synthesis Example 93

In the drybox, HFANB (7.40 g, 0.0270 mol), 0.550 g of hydroxyethyl ester of 5-norbornene carboxylic acid (0.00300 mol), 1.7 mL of a 0.0045 M methylene chloride solution of DANFABA (0.00765 mmol); and 0.29 g of dimethyl ethyl silane (3.30 mmol, 10 mol percent of the monomer used) were placed into a vial equipped with a TEFLON® coated stirbar. The total volume was increased to 20 mL by the addition of toluene and the vial was sealed with a septum cap. The mixture was heated to 80° C. Once temperature was reached, 1.0 mL of a 0.0026 M solution of Pd(acetate)$_2$(triisopropylphosphine)$_2$ (0.0026 mmol) in toluene was added to the monomer reaction mixture. The mixture was stirred for 18 h. After polymerization the reaction mixture was cooled and poured into hexane to precipitate the polymer. The polymer was filtered and dried in a vacuum oven at 80° C. Yield 3.30 g (42%). Mw=3690; Mn=2380.

Synthesis Example 94

Example 34 was repeated except that less dimethyl ethyl slime (7 mol percent of the monomer used) was employed. Yield 4.20 g (53%). Mw=4400; Mn=2720.

Synthesis Example 95

HFANB (16.5 g, 0.0602 mol), hydroxyethyl ester of 5-norbornene carboxylic acid (2.05 g, 0.0113 mol), trimethylsilane ester of 5-norbornene carboxylic acid (0.80 g, 0.0038 mol), and 0.120 g DANFABA (0.150 mmol) were weighed into a glass pressure reactor and combined with sufficient toluene to make a total reaction mixture of 50 mL. The vessel was charged with hydrogen gas to 10 psig and heated to 80° C. The hydrogen gas was relieved and to this mixture was added 0.0235 g of trans-bis(tricyclohexylphosphine) palladium diacetate (0.0300 mmol). The mixture was stirred for 18 h. Some additional toluene and acetone was added and the polymer was precipitated by pouring the reaction mixture into heptane, filtered, and dried at 80° C. in a vacuum oven. Yield 11.3 g (58%). Mw=237000; Mn=40000.

Synthesis Example 96

HFANB (65.8 g, 0.240 mol), hydroxyethyl ester of 5-norbornene carboxylic acid (8.20 g, 0.0450 mol), trimethylsilane ester of 5-norbornene carboxylic acid (3.19 g, 0.0150 mol), and 0.481 g DANFABA (0.600 mmol) were weighed into a glass pressure reactor and combined with sufficient toluene to make a total reaction mixture of 200 mL. The vessel was sparged with hydrogen gas for 15-20 minutes and then charged with 90 psig hydrogen. The mixture was heated to 80° C. The hydrogen gas was relieved and to this mixture was added 0.0735 g of trans-bis(di-i-propylphenylphosphine) palladium diacetate (0.120 mmol) in toluene. The mixture was stirred for 18 h. The polymer was precipitated by pouring the reaction mixture into heptane, filtered and dried at 80° C. in a vacuum oven. Yield 31.9 g (41%). Mw=4550; Mn=3100.

Synthesis Example 97

HFANB (74.9 g, 0.273 mol), hydroxyethylester of 5-norbornene carboxylic acid (4.92 g, 0.0270 mol), and 0.481 g DANFABA (0.600 mmol) were weighed into a glass pressure reactor and combined with sufficient toluene to make a total reaction mixture of 200 mL. The vessel was sparged with hydrogen gas for 15-20 minutes and then charged with 90 psig hydrogen. The mixture was heated to 80° C. The hydrogen gas was relieved and to this mixture was added 0.0735 g of trans-bis(di-1-propylphenylphosphine) palladium diacetate (0.120 mmol) in toluene. The mixture was stirred for 18 h. Thereafter, the polymer was precipitated by pouring the reaction mixture into heptane. Then the precipitated polymer was filtered and dried at 90° C. in a vacuum oven. Yield 64.3 g (81%). Mw=7780; Mn=4170. The composition of the polymer was determined to be 90:10 molar ratio of HFANB and hydroxyethyl ester of 5-norbornene carboxylic acid by $^{13}$C NMR spectrometry. The optical density of this polymer at 193 nm was determined to be 0.15 absorbance units/micron.

Synthesis Example 98

The monomers, 5-norbornene-2-methanol acetate (5.32 g, 0.032 mol) and hydroxyethyl ester of 5-norbornene-2-carboxylic acid (1.46 g, 0.00800 mol), triethylsilane (0.19 g, 0.0017 mol), 2.0 mL of a 0.003 M solution of DANFABA in methylene chloride, and sufficient toluene to yield 27 mL of solution were added to a vial equipped with a TEFLON® stir bar. The vial was sealed and heated to 80° C. The catalyst, 2.0 mL of Catalyst Example 1 (0.001 M solution in methylene chloride), was injected into the monomer mixture. After 17 hours, the mixture was cooled and the polymer was precipitated into 300 mL of hexane, filtered and dried at 80° C. in a vacuum oven. Yield 2.85 g (42%). Mw=13600 and Mn=6700 as determined by GPC techniques.

Synthesis Example 99

Synthesis Example 98 was repeated but with palladium catalyst 5. Yield 2.38 g (35%).

Synthesis Example 100

The monomers, 5-norbornene-2-ethanol (0.55 g, 0.004 mol) and HFANB (9.87 g, 0.036 mol), triethylsilane (0.52 g, 0.0044 mol), 2.0 mL of a 0.003 M solution of DANFABA in methylene chloride, and sufficient toluene to yield 27 mL of solution were added to a vial equipped with a TEFLON® stir bar. The vial was sealed and heated to 80° C. The catalyst, 2.0 mL of Catalyst Example 1 (0.001 M solution in methylene chloride), was injected into the monomer mixture. After 17 hours, the mixture was cooled and the polymer was precipitated into 300 mL of hexane, filtered and dried at 80° C. in a vacuum oven. Yield 5.64 g (54%).

Synthesis Example 101

The monomers, norbornene (42.4 g, 0.45 mol) and 5-triethoxysilylnorbornene (12.8 g, 0.0500 mol), triethylsilane (6.46 g, 0.0556 mol), and DANFABA (0.020 g, 0.025 mmol) and sufficient toluene to yield 330 mL of solution were added to a vial equipped with a TEFLON® stir bar. The vial was sealed and heated to 80° C. The catalyst, 2.0 mL of palladium bis(tri-1-propylphosphine)diacetate (0.005 M solution in toluene), was injected into the monomer mixture. After 18 hours, the mixture was cooled and the polymer was precipitated into methanol, filtered and dried at 80° C. in a vacuum oven. Yield 40 g (73%). Mw=109000 and Mn=46500 as determined by GPC techniques in THF/cyclohexane. The molar ratio of norbornene to 5-triethoxysilylnorbornene was 87:13 according to $^{13}$C NMR measurements.

Synthesis Example 102

The monomers, norbornene (42.4 g, 0.45 mol) and 5-triethoxysilylnorbornene (12.8 g, 0.0500 mol), triethylsilane (1.80 g, 0.0155 mol), and DANFABA (0.020 g, 0.025 mmol) and sufficient toluene to yield 330 mL of solution were added to a vial equipped with a TEFLON® stir bar. The vial was sealed and heated to 80° C. The catalyst, 2.0 mL of palladium bis(tri-i-propylphosphine)diacetate (0.005 M solution in toluene), was injected into the monomer mixture. After 18 hours, the mixture was cooled and the polymer was precipitated into methanol, filtered and dried at 80° C. in a vacuum oven. Yield 52 g (94%). Mw=201000 and Mn=53300 as determined by GPC techniques in THF/cyclohexane. The molar ratio of norbornene to 5-triethoxysilylnorbornene was 89:11 according to $^{13}$C NMR measurements.

Synthesis Example 103

This example demonstrates the copolymerization of 1-methylcyclopentyl ester of 5-norbornene carboxylic acid (MCPNB), tetrahydro-2-oxo-3-furanyl ester of 5-norbornene carboxylic acid (BuLacEsNB), and HFANB using [Pd(NCMe)(OAc)(P(cyclohexyl)$_2$(t-butyl))$_2$]B(C$_6$F$_5$)$_4$ at a ratio of MCPNB:BuLacEsNB:HFANB 40:50:10. The copolymer can be used in positive tone compositions. The monomers, MCPNB (35.2 g, 0.160 mol), BuLacEsNB (44.5 g, 0.200 mol) and HFANB (11.0 g, 0.0401 mol), as well as triethylsilane (2.45 g, 0.211 mol) and lithium tetrakis(pentafluorophenyl)borate.2.5 diethyletherate (4.2 g, 0.048 mmol) and sufficient toluene to yield 260 mL of solution were added to a vial equipped with a TEFLON® stir bar. The vial was sealed and heated to 75° C. An 8 mL solution of Catalyst Example 6 (2.23 g, 0.00160 mol) in methylene chloride was injected into the monomer mixture. After 18 hours, the mixture was cooled yielding a red-orange solution. The solution was diluted with 64 mL of THF and 64 mL of isopropanol and added to a stainless steel pressure vessel. The vessel was charged with carbon monoxide gas (140 psig) and heated to 80° C. with stirring. The carbon monoxide pressure was adjusted to 155 psig and the reaction was allowed to run for 4 h. The mixture was cooled, drained from the reactor and filtered through a 0.22 micron filter to remove black palladium metal. The yellowish filtrate was added to hexane (10-fold volumetric excess) to precipitate the polymer. The polymer was filtered and dried at 85° C. in a vacuum oven overnight. The polymer was redissolved in 100 mL of a 50:50 mixture by volume of THF and methanol. The solution was added to methanol (10-fold volumetric excess). The precipitated polymer was filtered and dried at 85° C. in a vacuum oven overnight. Yield 39.6 g (44%). The molecular weights were Mw=6900 and Mn=3800, as determined by GPC techniques. The molar ratio of MCPNB, BuLacEsNB, HFANB, and 5-norbornene carboxylic acid was 29:49:9:13 according to $^{13}$C NMR measurements. The optical density of this polymer, measured at 193 nm, was found to be 0.35 absorbance units/micron.

Synthesis Example 104

This example demonstrates the copolymerization of MCPNB, BuLacEsNB and HFANB using [Pd(NCMe)(OAc)(P(cyclohexyl)$_2$(t-butyl))$_2$]B(C$_6$F$_5$)$_4$ at a ratio of MCPNB:BuLacEsNB:HFANB 35:50:15. The copolymer can be used in positive tone compositions. The monomers, MCPNB (30.8 g, 0.140 mol), BuLacEsNB (44.5 g, 0.200 mol) and HFANB (16.5 g, 0.0602 mol), as well as triethylsilane (2.45 g, 0.211 mol) and lithium tetrakis(pentafluorophenyl)borate.2.5 diethyletherate (4.2 g, 0.048 mmol) and sufficient toluene to yield 260 mL of solution were added to a vial equipped with a TEFLON® stir bar. The vial was sealed and heated to 75° C. An 8 mL solution of Catalyst Example 6 (2.23 g, 0.00160 mol) in methylene chloride was injected into the monomer mixture. After 18 hours, the mixture was cooled yielding a clear orange solution. The solution was diluted with 64 mL of THF and 64 mL of isopropanol and added to a stainless steel pressure vessel. The vessel was charged with carbon monoxide gas (140 psig) and heated to 80° C. with stirring. The carbon monoxide pressure was adjusted to 155 psig and the reaction was allowed to run for 4 h. The mixture was cooled, drained from the reactor and filtered through a 0.22 micron filter to remove black palladium metal. The yellowish filtrate was added to hexane (10-fold volumetric excess) to precipitate the polymer. The polymer was filtered and dried at 85° C. in a vacuum oven overnight. The polymer was redissolved in 100 mL of a 50:50 mixture by volume of THF and methanol. The solution was added to methanol (10-fold volumetric excess). The precipitated polymer was filtered and dried at 85° C. in a vacuum oven overnight. Yield 37.3 g (41%). Mw=7220 and Mn=4210. The molar ratio of MCPNB, BuLacEsNB, HFANB, and 5-norbornene carboxylic acid was 26:51:14:9 according to $^{13}$C NMR measurements. The optical density of this polymer, measured at 193 nm, was found to be 0.33 absorbance units/micron.

Synthesis Example 105

This example demonstrates the copolymerization of MCPNB and BuLacEsNB using [Pd(NCMe)(OAc)(P(cyclohexyl)$_2$(t-butyl))$_2$]B(C$_6$F$_5$)$_4$ at a 50:50 ratio. The monomers, MCPNB (24.9 g, 0.113 mol) and BuLacEsNB (25.1 g, 0.113 mol), as well as triethylsilane (1.39 g, 0.0119 mol) and 100 mL of toluene were added to a vial equipped with a TEFLON® stir bar. The vial was sealed. The mixture was sparged with nitrogen for 15 m. The mixture was heated to 80° C. Then lithium tetrakis(pentafluorophenyl)borate.2.5 diethyletherate (2.37 mg, 2.72 mmol) and Catalyst Example 6 (1.26 g, 0.904 mmol), both dissolved in a minimum of 1,2-dichloroethane, were added to the heated mixture. The mixture was allowed to react for 18 h, after which time the mixture was cooled. Solids were observed in the mixture that redissolved upon addition of 10 mL of THF. The solution was further diluted with THF and methanol (16 volume percent, each). The resulting solution was added to a stainless steel pressure vessel and was treated with carbon monoxide (120 psig) for 7 h at 50° C. The mixture was cooled, drained from the reactor and filtered through a 1.0 and a 0.22 micron filter to remove black palladium metal. The filtrate was concentrated using a rotary evaporator and then added to a 10-fold volumetric excess of a methanol/THF mixture (90:10 by volume). The polymer was filtered and washed twice with methanol. Yield 25.8 g (52%). Mw=7510 and Mn=4180. The molar ratio of 1-methylpentyl ester of 5-norbornene carboxylic acid, tetrahydro-2-oxo-3-furanyl ester of 5-norbornene carboxylic acid and 5-norbornene carboxylic acid was 43:49:8 according to $^{13}$C NMR measurements.

Synthesis Example 106

This example demonstrates the copolymerization of MCPNB and BuLacEsNB using [Pd(NCMe)(OAc)(P(cyclohexyl)$_2$(t-butyl))$_2$]B(C$_6$F$_5$)$_4$ at a 70:30 ratio. The monomers, MCPNB (34.9 g, 0.159 mol) and BuLacEsNB(15.1 g, 0.068 mol), as well as triethylsilane (1.39 g, 0.0119 mol) and 100 mL of toluene were added to a vial equipped with a TEFLON® stir bar. The vial was sealed. The mixture was sparged with nitrogen for 15 m. The mixture was heated to 80° C. Then lithium tetrakis(pentafluorophenyl)borate.2.5 diethyletherate (2.37 mg, 2.72 mmol) and Catalyst of Example 6 (1.26 g, 0.904 mmol), both dissolved in a minimum of 1,2-dichloroethane, were added to the heated mixture. The mixture was allowed to react for 18 h, after which time the mixture was cooled. The solution was further diluted with THF and methanol (16 volume percent each). The resulting solution was added to a stainless steel pressure vessel and was treated with carbon monoxide (120 psig) for 7 h at 50° C. The mixture was cooled, drained from the reactor and filtered through a 1.0 and a 0.22 micron filter to remove black palladium metal. The filtrate was concentrated using a rotary evaporator and then added to a 10-fold volumetric excess of a methanol/THF mixture (90:10 by volume). The polymer was filtered and washed twice with methanol. Yield 33.3 g (67%). Mw=7630 and Mn=4260. The molar ratio of MCPNB, BuLacEsNB and 5-norbornene carboxylic acid was 61:30:9 according to $^{13}$C NMR measurements.

Synthesis Example 107

Examples 107-109 show that triethylsilane effectively controls the molecular weight of polymer compositions made with the neutral nickel catalyst, $(\eta^6\text{-toluene})\text{Ni}(C_6F_5)_2$.

A mixture of HFANB (2.88 g, 10.5 mmol) and trimethylsilyl protected 5-norbornene-2-acetic acid (0.12 g, 0.55 mmol) in toluene was added to a vial. The mixture was sparged with nitrogen for 15 min. To this mixture was added a toluene (2 mL) solution of $(\eta^6\text{-toluene})\text{Ni}(C_6F_5)_2$ (0.11 g, 0.22 mmol). The mixture was stirred at room temperature overnight. To this mixture was added 1 mL of glacial acetic acid and 2 mL of hydrogen peroxide (30%) in a equal volume of deionized water. The mixture was stirred overnight. The two phases were allowed to separate. The water phase was discarded and the organic phase was washed with water. The organic phase was separated from the water phase and added to hexane to precipitate the polymer. The polymer was isolated by filtration and then dried in a vacuum oven overnight. Yield 2.32 g (77%). Mw=56100 and Mn=26800. The composition of the polymer was determined to be a 95:5 molar ratio of HFANB and 5-norbornene-2-acetic acid by $^1$H NMR.

Synthesis Examples 108-109

A mixture of HFANB (2.88 g, 10.5 mmol) and trimethylsilyl protected 5-norbornene-2-acetic acid (0.12 g, 0.55 mmol), and triethylsilane (0.006 g, 0.052 mmol) in toluene was added to a vial. The mixture was sparged with nitrogen for 15 min. To this mixture was added a toluene (2 mL) solution of $(\eta^6\text{-toluene})\text{Ni}(C_6F_5)_2$ (0.11 g, 0.22 mmol). The mixture was stirred at room temperature overnight. To this mixture was added 1 mL of glacial acetic acid and 2 mL of hydrogen peroxide (30%) in an equal volume of deionized water. The mixture was stirred overnight. The two phases were allowed to separate. The water phase was discarded and the organic phase was washed with water. The organic phase was separated from the water phase and added to hexane to precipitate the polymer. The polymer was isolated by filtration and then dried in a vacuum oven overnight. Yield 2.31 g (77%). Mw=51800 and Mn=24800. The composition of the polymer was determined to be a 90:10 molar ratio of HFANB and 5-norbornene-2-acetic acid by $^1$H NMR.

This experiment was repeated with an increased amount of triethylsilane. The results are presented in Table 19.

TABLE 19

Copolymerization of HFANB and trimethylsilyl protected 5-norbornene-2-acetic acid

| Example No. | Mol. % of triethylsilane | Conversion Percentage | Mw | Mn |
| --- | --- | --- | --- | --- |
| 107 | 0 | 77 | 56100 | 26800 |
| 108 | 0.5 | 77 | 51800 | 24800 |
| 109 | 2.5 | 70 | 43800 | 19600 |

Examples 107-109 show that triethylsilane effectively controls the molecular weight of polymer compositions made with the neutral nickel catalyst, $(\eta^6\text{-toluene}) \text{Ni}(C_6F_5)_2$.

Synthesis Example 110

This example demonstrates the formation of Et$_3$SiOEt as a result of using Et$_3$SiH as the chain transfer reagent and ethanol as the activator in the method of the present invention, and supports step D in catalytic cycle A in FIG. 1. Synthesis Example 11 was repeated, but instead of precipitating the polymer, the reaction mixture was analyzed by field ionization mass spectrometry. In addition to solvents (toluene and methylene chloride), monomer, and triethylsilane, a molecular ion peak appeared at 160 m/z consistent with the formation of triethylsilane ethoxide.

Synthesis Example 111

This example demonstrates how the addition of Et$_3$SiH to palladium catalysts generates palladium hydride species. An NMR tube was charged with trans-Pd(OAc)$_2$(P(i-propyl)$_3$)$_2$ (10.6 mg, 19.4 µmol) and 1.1 ml CD2Cl2. The tube is shaken to dissolve the Pd complex and then Et$_3$SiH (6.22 µL, mmol, 38.9 µmol, 2.0 equiv) was added via gas-tight syringe. The tube was sealed and shaken. A slight darkening of the solution from light yellow to yellow-orange was observed. After sitting at ca 23° C. for 10 h, NMR spectra were acquired. The $^{31}$P NMR spectrum shows the majority of starting material is consumed ($^{31}$P NMR: δ 33.2 ppm) and the appearance of new palladium hydride species as manifested by a triplet appearing in the upfield region of the spectrum ($^1$H NMR: δ −14.93 ppm). Similar results were obtained when 5 equiv of Et$_3$SiH was employed.

Synthesis Example 112

This example demonstrates how the addition of Et$_3$SiH to palladium catalysts generates palladium hydride species as depicted in FIG. 1. An NMR tube was charged with trans-[Pd (NCMe)(OAc)(P(i-propyl)$_3$)$_2$]B(C$_6$F$_5$)$_4$ (29.9 mg, 24.0 µmol) and 1.1 ml CD$_2$Cl$_2$. The tube was shaken to dissolve the Pd complex and then Et$_3$SiH (3.9 µL, mmol, 24.0 µmol, 1.0 equiv) was added via gas-tight syringe. The tube was sealed and shaken. After sitting at ca. 23° C. for 2 h, NMR spectra were acquired. The $^1$H NMR spectrum shows the appearance of new signals corresponding to palladium hydride species appearing in the upfield region of the spectrum in the range of δ −15.2 to −15.8 ppm. Similar results were obtained upon addition of 5 equiv of Et$_3$SiH.

Synthesis Example 113

Comparative Example

HFANB (12.0 g, 43.8 mmol) and 1-hexene (0.92 g, 10.9 mmol, 20 mole percent based on the moles of monomer) are weighed and combined in a glass vial. To this solution was added 8 mL of anisole. A stock solution of 0.0069 g of trans-bis(tricyclohexyl-phosphine)palladium diacetate (0.0088 mmol, Catalyst B) and 0.035 g DANFABA (0.044 mmol) in 10 mL of anisole is made. A one mL portion of this solution was added to above-mentioned monomer/1-hexene solution. Next, this mixture was heated at 120° C. for 91 hours. Thereafter, the polymer was precipitated by pouring the reaction mixture into hexane. The precipitated polymer was filtered and dried at 90° C. in a vacuum oven. The conversion was determined gravimetrically. Table 15 shows the results.

Synthesis Examples 114-118

Comparative

Synthesis Examples 114 to 118 are identical in nature to Synthesis Example 113 except that the mole percent of 1-hexene is varied as noted in Table 15. The results from Examples 114 to 118 are also detailed below in Table 15.

TABLE 15

Homopolymerization of HFANB

| Example No. | Mol. % of 1-hexene | Conversion Percentage | Mw | Mn | Mw/Mn |
|---|---|---|---|---|---|
| 114 | 20 | 84 | 39,562 | 8,590 | 4.61 |
| 115 | 30 | 85 | 23,929 | 5,929 | 4.04 |
| 116 | 40 | 86 | 16,251 | 4,607 | 3.53 |
| 117 | 50 | 83 | 11,651 | 3,837 | 3.04 |
| 118 | 55 | 80 | 9,429 | 3,451 | 2.73 |
| 119 | 60 | 70 | 8,549 | 3,771 | 2.27 |

It is understood to those skilled in the art that various molecular weight cyclic olefin polymers can be made by adjusting the percentage of hexene-1 (or other olefin chain transfer agents such as ethylene or cyclopentene) used in the reaction mixture.

The optical density at 193 nm of the polymers in Table 15, and other HFANB homopolymers made using olefinic chain transfer agents, as well as other HFANB homopolymers made using $H_2$ (Synthesis Examples 26-30) and triethylsilane (Synthesis Examples 62-66) in a similar manner but with higher and lower molecular weights, are presented as a function of Mw in FIG. 7.

Optical Density Measurement

The optical density (OD) of the polymers was determined by the following method. A 15 weight percent solution of the desired polymer was formed using propylene glycol methyl ether acetate (PGMEA). The solution was dispensed onto a 1-inch quartz wafer and spun at 500 rpm for 15 sec and 2000 rpm for 60 sec. The wafers were then baked for 60 sec at 110° C.

The optical absorbance was measured at 193 nm using a Cary 400 Scan UV-Vis spectrophotometer. The thickness of the films was then measured using a TENCOR Profilometer after the films were scored. Optical density of the film was then calculated by dividing the absorbance by the thickness (in microns).

A comparison of the OD as a function of Mw of polymers made using olefinic chain transfer agents and the OD of polymers made using dihydrogen (from Examples 26-30) and triethylsilane (from Examples 62-66) as chain transfer agents is presented in FIG. 7 below. This figure redisplays the data showing the increase of OD as molecular weight decreases for polymers made using olefinic chain transfer agents and the OD of several polymers made using dihydrogen and triethylsilane non-olefinic chain transfer agents in accordance with embodiments of the present invention. As seen, polymers made using dihydrogen or triethylsilane as chain transfer agents give substantially lower OD's and that the OD of these polymers is unrelated to molecular weight. FIG. 7 shows the optical density of poly(α,α-bis(trifluoromethyl)-bicyclo[2.2.1]hept-5-ene-2-ethanol) with different molecular weights using olefins, triethylsilane and hydrogen.

Negative Tone Imaging Example 1

Imaging of Negative Tone Polymer (Synthesis Example 92)

A mixture was prepared containing 0.25 g of the polymer obtained from Example 27, 0.025 g hexamethoxy methyl melamine (10% wt/wt) as a cross-linking agent, 0.0075 g Rhordosil (Rhodia Company, 3% wt/wt) photoacid generator, 0.005 g of 1 chloro-4-propoxy-9H-thioxanthen-9-one (Aldrich Scientific, 2% wt/wt), dissolved in 0.75 g of propylene glycol methyl ether acetate (PGMEA).

Wafers were prepared by base coating with hexamethyl disilazine (0.25 g), spinning for 500 rpm for 15 seconds and 2000 rpm for 60 seconds. These wafers were then baked on a hotplate for 60 seconds at 130° C. Approximately 0.50 g of the polymer formulation was filtered through a 0.2 µm TEFLON® syringe filter and applied to the wafer. The wafer was spun at 500 rpm for 15 seconds, followed by 2000 rpm for 60 seconds and then soft baked at 75° C. for 90 seconds.

Figure 8A:
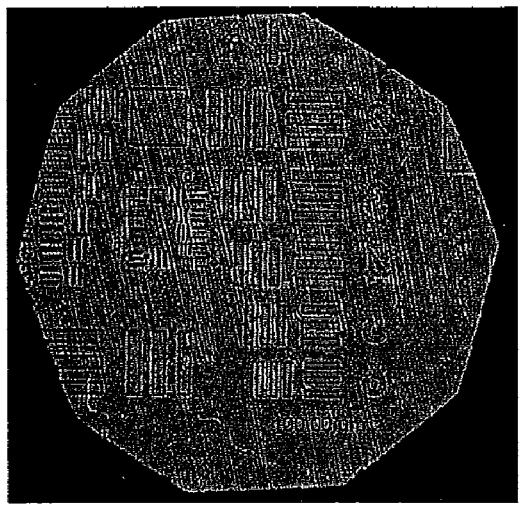
FIG. 8A shows a photomicrograph of an imaged wafer prepared according to the present invention.
Figure 8B:
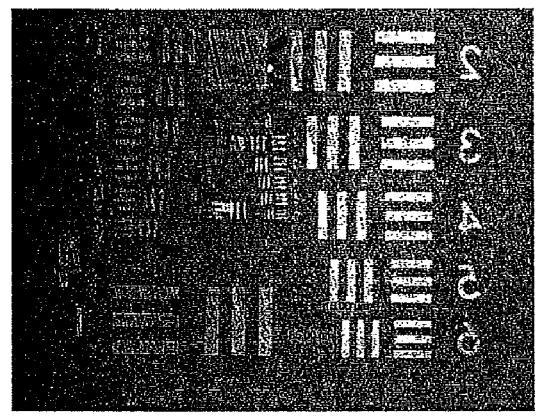
FIG. 8B shows a photomicrograph of an imaged wafer prepared according to the present invention.

Wafers were imaged on a mask aligner using a mercury vapor light source with an exposure dose of 500 mJ. The wafers were post-exposure baked at 75° C. for 120 seconds. Latent images were observed following the post-exposure bake. The wafers were developed in a 0.26 N solution of tetramethyl ammonium hydroxide (TMAH) by immersing the wafer in the TMAH solution for 4 minutes. The wafer was then removed and rinsed in deionized water, then dried in a stream of dry nitrogen. Photomicrographic images (FIGS. 8A and 8B) were prepared using a Nikon microscope at a magnification of 10×. As seen in the images, features 15 µm×85 µm were clearly resolved. Profilometry of the surface of the developed wafer demonstrated that the exposed region retained film, thus confirming the negative tone performance of this formulation.

The present invention has been described with reference to specific details of particular embodiments thereof. It is not intended that such details be regarded as limitations upon the scope of the invention except insofar as and to the extent that they are included in the accompanying claims.

We Claim:

1. A negative tone photoresist composition comprising:
   A) a solvent;
   B) a photosensitive acid generator;
   C) a crosslinking agent containing one or more functional groups; and
   D) one or more negative tone imaging polymers containing one or more functional groups containing moieties having a functional group that is reactive with the functional groups of the crosslinking agent,
   wherein each negative tone imaging polymer comprises a first monomer unit according to Formula (I):

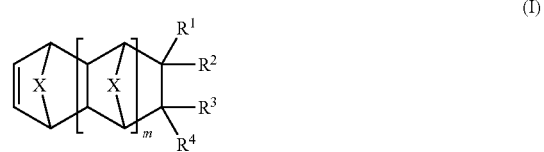

wherein X is selected from —CH$_2$—, —CH$_2$—CH$_2$—, O, S, and —NH—; m is an integer from 0 to 5; and each occurrence of R$^1$, R$^2$, R$^3$ and R$^4$ is independently selected from one of the following groups:
- a) H, halogen, linear, branched or cyclic C$_1$ to C$_{30}$ alkyl, aryl, aralkyl, alkaryl, alkenyl, or alkynyl;
- b) linear or branched C$_1$ to C$_{24}$ halohydrocarbyls, —(CH$_2$)$_n$C(O)OR*, —(CH$_2$)$_n$C(O)OR', —(CH$_2$)$_n$OR, —(CH$_2$)$_n$OC(O)R, —(CH$_2$)$_n$C(O)R, —(CH$_2$)$_n$—OC(O)OR', —(CH$_2$)$_n$C(R)$_2$CH(R)(C(O)OR), —(CH$_2$)$_n$(CR$_2$)$_n$CH(R)(C(O)OR), —(CH$_2$)$_n$C(OR***)(CF$_3$)$_2$, —(CR''$_2$)$_n$OR, —CH$_2$—[O(CH$_2$)$_n$]$_{m*}$—C(OR*)(CF$_3$)$_2$, —(CH$_2$)$_n$C(R)$_2$CH(C(O)OR)$_2$, —(CH$_2$)$_n$C(O)OH, CH$_2$)$_n$C(R*)$_2$CH(R*)(C(O)OH), —(CH$_2$)$_n$—C(O)—O—R$^{18}$, —(CH$_2$)$_n$—C(CY$_3$)$_2$—OH, and —(CH$_2$)$_n$C(R*)$_2$CH(C(O)OH)$_2$; where each occurrence of R is independently selected from H and linear or branched C$_1$ to C$_{10}$ alkyl; R' is a linear or branched C$_1$ to C$_{10}$ alkyl or alkylol; R'' is selected from H and halogen; n and m* are each an integer from 0 to 10; R* represents an acid labile group cleavable by a photoacid generator; R** is selected from R' and R* as defined above and tertiary C$_4$ to C$_{20}$ alkyl and cycloalkyl, C$_1$ to C$_6$ trialkylsilyl groups, and C$_4$ to C$_{20}$ oxoalkyl; R*** is selected from H, —CH$_2$OR''', —C(O)OR''' and —C(O)R''', where R''' is selected from methyl, ethyl, t-butyl, and C$_1$ to C$_{20}$ linear or branched cycloaliphatic, R$^{18}$ is selected from H, and linear, branched or cyclic C$_1$-C$_{24}$ alkyl, aryl, aralkyl, and alkaryl, Y is selected from F and Cl and at least one occurrence of Y is F;
- c) C$_1$ to C$_{30}$ linear, branched, or cyclic alkyl, aryl, aralkyl, alkaryl, alkenyl or alkynyl containing one or more hetero atoms selected from O, N, and Si;
- d) a hydroxy alkyl ether according to Formula (IV):

-A-O—[—(CR$^{35}_2$—)$_q$—O—]$_p$—(CR$^{35}_2$—)$_q$—OH     (IV)

wherein A is a linking group selected from C$_1$ to C$_6$ linear, branched, or cyclic alkylene, each occurrence of R$^{35}$ is independently selected from H, methyl, ethyl and a halide, q is from 1 to 5, and p is from 0 to 3;
- e) a group according to Formula (V):

—R$^{36}$—Z     (V)

where R$^{36}$ is a linear, branched or cyclic C$_1$ to C$_{30}$, optionally partially or completely halogenated, alkylene, arylene, aralkylene, alkarylene, alkenylene or alkynylene linking group and Z is a functional group selected from hydroxyl, carboxylic acid, amine, thiol, isocyanate, and epoxy; and
- f) C$_r$X''$_{2r+1}$, wherein X'' is independently a halogen selected from fluorine, chlorine, bromine, or iodine and r is an integer from 1 to 20, further wherein the functional groups of the negative tone imaging polymers are selected from the group consisting of a hydroxy alkyl ether according to Formula (IV), where A, R$^{35}$, q and p are as defined; a group according to Formula (V), where R$^{36}$ and Z are as defined; a group according to —(CH$_2$)$_n$—C(CY$_3$)$_2$—OH, where n and Y are as defined; a group according to —(CH$_2$)$_n$C(O)OR* where n and R* are as defined; and a —(CH$_2$)$_z$—C(CF$_3$)$_2$—O—(CH$_2$)$_z$—CO—(OR$^\#$) group, where z is an integer from 1 to 6 and R$^\#$ is C$_1$-C$_6$ linear or branched alkyl.

2. The negative tone photoresist composition of claim 1, wherein m=0, R$^1$ is the hydroxy alkyl ether according to Formula (IV), and R$^2$, R$^3$, and R$^4$ are each H in the negative tone imaging polymers.

3. The negative tone photoresist composition of claim 1, wherein each of R$^1$, R$^2$, R$^3$ and R$^4$ are independently selected from H and a group according to Formula (VIII):

—CH$_2$—C(CY$_3$)$_2$—OH     (VIII)

wherein Y is selected from F and Cl and at least one occurrence of Y is F and the negative tone imaging polymers are free of hydroxy alkyl ether according to Formula (IV).

4. The negative tone photoresist composition of claim 1, wherein the negative tone imaging polymer in (D) contains hydroxyl groups and the crosslinking agent (C) is a compound which is capable of reacting with the hydroxyl groups of the polymer in (D).

5. The negative tone photoresist composition of claim 1, wherein the crosslinking agent (C) is activated by an acid generated by the photosensitive acid generator (B).

6. The negative tone photoresist composition of claim 1, wherein the crosslinking agent (C) includes one or more compounds containing one or more groups selected from the group consisting of methylol, alkoxyalkyl and carboxymethyl group substituted phenols; methylol, alkoxyalkyl and carboxymethyl group substituted cyclic ureas; methylol, alkoxyalkyl and carboxymethyl group substituted melamines; and methylol, alkoxyalkyl and carboxymethyl group substituted benzoguanine compounds.

7. The negative tone photoresist composition of claim 1, wherein the photosensitive acid generator (B) is a compound that, upon exposure to radiation, generates a strong acid.

8. The negative tone photoresist composition of claim 1, wherein the photosensitive acid generator (B) includes one or more compounds selected from triflates, pyrogallols, onium salts, hexafluoroarsenates, trifluoromethanesulfonates, esters of hydroxyimides, α,α'-bis-sulfonyl-diazomethanes, sulfonate esters of nitro-substituted benzyl alcohols and napthoquinone-4-diazides.

9. The negative tone photoresist composition of claim 8, wherein the triflates comprise triphenylsulfonium triflate; the pyrogallols comprise trimesylate of pyrogallol; and the onium salts comprise one or both of triarylsulfonium and diaryliodium hexafluoroantimonates.

10. The negative tone photoresist composition of claim 1, wherein the solvent (A) comprises one or more solvents selected from the group consisting of propylene glycol methyl ether acetate, cyclohexanone, butyrolactate, and ethyl lactate.

11. A method of generating a negative tone resist image on a substrate comprising the steps of: (a) coating a substrate with a film comprising the negative tone photoresist composition of claim 1; (b) imagewise exposing the film to radiation to form an image; and (c) developing the image in the film where selected portions of the substrate are exposed.

12. The method of claim 11, wherein the substrate comprises one or more of silicon, ceramics and polymers.

13. The method of claim 11, wherein before the film has been exposed to radiation in (b), the film is heated to from 90° C. to 150° C. for from 30 seconds to 5 minutes.

14. The method of claim 11, wherein the film is imagewise exposed in (b) from a radiation source selected from mercury lamps, mercury/xenon lamps, xenon lamps, argon fluoride lasers, krypton fluoride lasers, x-rays and electron beams.

15. The method of claim 11, wherein the film is imagewise exposed in (b) at a wavelength of from 90 nm to 514 nm.

16. The method of claim 11, wherein after the film has been exposed to radiation, the film is heated to a temperature of from 90° C. to 150° C. for from 30 seconds to 5 minutes.

17. The method of claim 11, wherein the negative tone image is developed using one or more solvents selected from the group consisting of propylene glycol methyl ether acetate, cyclohexanone, butyrolactate, and ethyl lactate.

18. An integrated circuit assembly method comprising the steps of:
(a) coating a substrate with the negative tone photoresist composition according to claim 1;
(b) imagewise exposing the film to radiation to form an image;
(c) developing the image in the film where selected portions of the substrate are exposed; and
(d) transferring the developed image to the substrate.

19. An integrated circuit chip, multichip module, or circuit board comprising the integrated circuit provided by the method of claim 18.

20. A photoresist composition comprising a poly(cyclic olefin) polymer comprising,
a first monomer unit according to Formula (I):

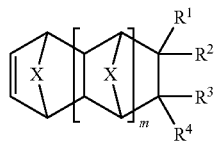

(I)

wherein X is selected from —$CH_2$—, —$CH_2$—$CH_2$—, O, S, and —NH—; m is an integer from 0 to 5; and each occurrence of $R^1$, $R^2$, $R^3$ and $R^4$ is independently selected from one of the following groups:

a) H, halogen, linear, branched or cyclic $C_1$ to $C_{30}$ alkyl, aryl, aralkyl, alkaryl, alkenyl or alkynyl;

b) linear or branched $C_1$ to $C_{24}$ halohydrocarbyls, —$(CH_2)_n$C(O)OR*, —$(CH_2)_n$C(O)OR', —$(CH_2)_n$OR, —$(CH_2)_n$ OC(O)R, —$(CH_2)_n$C(O)R, —$(CH_2)_n$—OC(O)OR', —$(CH_2)_n$C(R)$_2$CH(R)(C(O)OR), —$(CH_2)_n$(CR$_2$)$_n$ CH(R)(C(O)OR), —$(CH_2)_n$C(OR***) (CF$_3$)$_2$, —(CR''$_2$)$_n$OR, —$CH_2$—[O(CH$_2$)$_n$]$_{m*}$—C(OR*)(CF$_3$)$_2$, —$(CH_2)_n$C(R)$_2$CH(C(O)OR)$_2$, —$(CH_2)_n$C(O)OH, $CH_2)_n$C(R*)$_2$CH(R*)(C(O)OH), —$(CH_2)_n$—C(O)—O—$R^{18}$, —$(CH_2)_n$—C(CY$_3$)$_2$—OH, and —$(CH_2)_n$C(R*)$_2$CH(C(O)OH)$_2$; where each occurrence of R is independently selected from H and linear or branched $C_1$ to $C_{10}$ alkyl; R' is a linear or branched $C_1$ to $C_{10}$ alkyl or alkylol; R'' is selected from H and halogen; n and m* are each an integer from 0 to 10; R* represents an acid labile group cleavable by a photoacid generator; R** is selected from R' and R* as defined above and tertiary $C_4$ to $C_{20}$ alkyl and cycloalkyl, $C_1$ to $C_6$ trialkylsilyl groups, and $C_4$ to $C_{20}$ oxoalkyl; R*** is selected from H, —$CH_2$OR''', —C(O)OR''' and —C(O)R''', where R''' is selected from methyl, ethyl, t-butyl, and $C_1$ to $C_{20}$ linear or branched cycloaliphatic, $R^{18}$ is selected from H, and linear, branched or cyclic $C_1$-$C_{24}$ alkyl, aryl, aralkyl, and alkaryl, Y is selected from F and Cl and at least one occurrence of Y is F;

c) $C_1$ to $C_{30}$ linear, branched, or cyclic alkyl, aryl, aralkyl, alkaryl, alkenyl or alkynyl containing one or more hetero atoms selected from O, N, and Si;

d) a hydroxy alkyl ether according to Formula (IV):

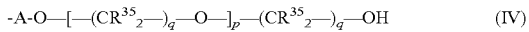

(IV)

wherein A is a linking group selected from $C_1$ to $C_6$ linear, branched, or cyclic alkylene, each occurrence of $R^{35}$ is independently selected from H, methyl, ethyl and a halide, q is from 1 to 5, and p is from 0 to 3;

e) a group according to Formula (V):

—$R^{36}$—Z (V)

where $R^{36}$ is a linear, branched or cyclic $C_1$ to $C_{30}$, optionally partially or completely halogenated, alkylene, arylene, aralkylene, alkarylene, alkenylene or alkynylene linking group and Z is a functional group selected from hydroxyl, carboxylic acid, amine, thiol, isocyanate and epoxy; and f) $C_rX''_{2r+1}$, wherein X'' is independently a halogen selected from fluorine, chlorine, bromine or iodine and r is an integer from 1 to 20; and a third monomer unit according to Formula (III):

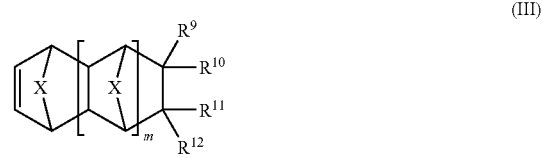

(III)

wherein m is an integer from 0 to 5; X is —$CH_2$—, —$CH_2$—$CH_2$—, O, S, or —NH—; $R^9$ to $R^{12}$ are independently selected from H, halogen, linear, branched or cyclic $C_1$ to $C_{30}$ alkyl, alkylol, aryl, aralkyl, alkaryl, alkenyl or alkynyl; a non-carboxylic acid group containing an active hydrogen with a pKa of 15 or less, and a carboxylic acid substituents selected from the group consisting of those in accordance with the formulas —$(CH_2)_q$C(O)OH, $(CH_2)_q$C($R^{25}$)$_2$CH($R^{25}$)(C(O)OH) or —$(CH_2)_q$C($R^{25}$)$_2$CH(C(O)OH)$_2$, wherein q is an integer from 0 to 10 and each occurrence of $R^{25}$ is independently selected from H, halogen, linear, branched or cyclic $C_1$ to $C_{10}$ alkyl, and linear, branched or cyclic $C_1$ to $C_{10}$ halogenated alkyl; and wherein at least one of $R^9$ to $R^{12}$ is a carboxylic acid substituent as described above.

21. A photoresist composition comprising a poly(cyclic olefin) polymer prepared by a method of polymerizing poly(cyclic)olefin monomers comprising:

(a) combining a monomer composition comprising one or more poly(cyclic)olefin monomers, a non-olefinic chain transfer agent and an optional activator compound in a reaction vessel to form a mixture; and (b) adding a polymerization catalyst containing Ni and/or Pd, the catalyst causing the mixture to polymerize;

wherein the non-olefinic chain transfer agent includes one or more compounds selected from the group consisting of $H_2$, alkylsilanes, alkylalkoxysilanes, alkylgermanes, alkylalkoxygermanes, alkylstannanes and alkylalkoxystannanes.

22. A photoresist composition comprising a poly(cyclic olefin) polymer comprising a first monomer unit according to Formula (I):

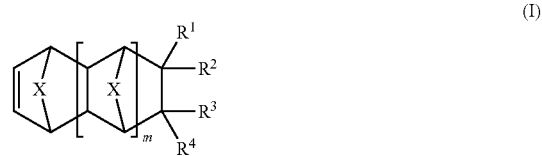

(I)

wherein X is selected from —CH$_2$—, —CH$_2$—CH$_2$—, O, S, and —NH—; m is an integer from 0 to 5; and each occurrence of R$^1$, R$^2$, R$^3$ and R$^4$ is independently selected from one of the following groups:

a) H, halogen, linear, branched or cyclic C$_1$ to C$_{30}$ alkyl, aryl, aralkyl, alkaryl, alkenyl or alkynyl;

b) linear or branched C$_1$ to C$_{24}$ halohydrocarbyls, —(CH$_2$)$_n$C(O)OR*, —(CH$_2$)$_n$C(O)OR', —(CH$_2$)$_n$OR, —(CH$_2$)$_n$OC(O)R, —(CH$_2$)$_n$C(O)R, —(CH$_2$)$_n$—OC(O)OR', —(CH$_2$)$_n$C(R)$_2$CH(R)(C(O)OR), —(CH$_2$)$_n$(CR$_2$)$_n$CH(R)(C(O)OR), —(CH$_2$)$_n$C(OR***)(CF$_3$)$_2$, —(CR"$_2$)$_n$OR, —CH$_2$—[O(CH$_2$)$_n$]$_{m*}$—C(OR*)(CF$_3$)$_2$, —(CH$_2$)$_n$C(R)$_2$CH(C(O)OR)$_2$, —(CH$_2$)$_n$C(O)OH, CH$_2$)$_n$C(R*)$_2$CH(R*)(C(O)OH), —(CH$_2$)$_n$—C(O)—O—R$^{18}$, —(CH$_2$)$_n$—C(CY$_3$)$_2$—OH, and —(CH$_2$)$_n$C(R*)$_2$CH(C(O)OH)$_2$; where each occurrence of R is independently selected from H and linear or branched C$_1$ to C$_{10}$ alkyl; R' is a linear or branched C$_1$ to C$_{10}$ alkyl or alkylol; R' is selected from H and halogen; n and m* are each an integer from 0 to 10; R* represents an acid labile group cleavable by a photoacid generator; R** is selected from R' and R* as defined above and tertiary C$_4$ to C$_{20}$ alkyl and cycloalkyl, C$_1$ to C$_6$ trialkylsilyl groups, and C$_4$ to C$_{20}$ oxoalkyl; R*** is selected from H, —CH$_2$OR''', —C(O)OR''' and —C(O)R''', where R''' is selected from methyl, ethyl, t-butyl, and C$_1$ to C$_{20}$ linear or branched cycloaliphatic, R$^{18}$ is selected from H, and linear, branched or cyclic C$_1$-C$_{24}$ alkyl, aryl, aralkyl, and alkaryl, Y is selected from F and Cl and at least one occurrence of Y is F;

c) C$_1$ to C$_{30}$ linear, branched, or cyclic alkyl, aryl, aralkyl, alkaryl, alkenyl or alkynyl containing one or more hetero atoms selected from O, N, and Si;

d) a hydroxy alkyl ether according to Formula (IV):

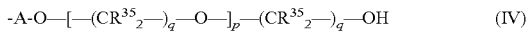

-A-O—[—(CR$^{35}$$_2$—)$_q$—O—]$_p$—(CR$^{35}$$_2$—)$_q$—OH (IV)

wherein A is a linking group selected from C$_1$ to C$_6$ linear, branched, or cyclic alkylene, each occurrence of R$^{35}$ is independently selected from H, methyl, ethyl and a halide, q is from 1 to 5, and p is from 0 to 3;

e) a group according to Formula (V):

—R$^{36}$—Z (V)

where R$^{36}$ is a linear, branched or cyclic C$_1$ to C$_{30}$, optionally partially or completely halogenated, alkylene, arylene, aralkylene, alkarylene, alkenylene or alkynylene linking group and Z is a functional group selected from hydroxyl, carboxylic acid, amine, thiol, isocyanate and epoxy; and f) C$_r$X"$_{2r+1}$, wherein X" is independently a halogen selected from fluorine, chlorine, bromine or iodine and r is an integer from 1 to 20.

23. A photoresist composition comprising a poly(cyclic olefin) polymer comprising, a first monomer unit according to Formula (I):

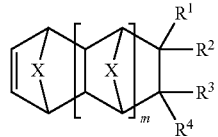

(I)

wherein X is selected from —CH$_2$—, —CH$_2$—CH$_2$—, O, S, and —NH—; m is an integer from 0 to 5; and each occurrence of R$^1$, R$^2$, R$^3$ and R$^4$ is independently selected from one of the following groups:

a) H, halogen, linear, branched or cyclic C$_1$ to C$_{30}$ alkyl, aryl, aralkyl, alkaryl, alkenyl or alkenyl;

b) linear or branched C$_1$ to C$_{24}$ halohydrocarbyls, —(CH$_2$)$_n$C(O)OR*, —(CH$_2$)$_n$C(O)OR', —(CH$_2$)$_n$OR, —(CH$_2$)$_n$OC(O)R, —(CH$_2$)$_n$C(O)R, —(CH$_2$)$_n$—OC(O)OR', —(CH$_2$)$_n$C(R)$_2$CH(R)(C(O)OR), —(CH$_2$)$_n$(CR$_2$)$_n$CH(R)(C(O)OR), —(CH$_2$)$_n$C(OR***)(CF$_3$)$_2$, —(CR"$_2$)$_n$OR, —CH$_2$—[O(CH$_2$)$_n$]$_{m*}$—C(OR*)(CF$_3$)$_2$, —(CH$_2$)$_n$C(R)$_2$CH(C(O)OR)$_2$, —(CH$_2$)$_n$C(O)OH, CH$_2$)$_n$C(R*)$_2$CH(R*)(C(O)OH), —(CH$_2$)$_n$—C(O)—O—R$^{18}$, —(CH$_2$)$_n$—C(CY$_3$)$_2$—OH, and —(CH$_2$)$_n$C(R*)$_2$CH(C(O)OH)$_2$; where each occurrence of R is independently selected from H and linear or branched C$_1$ to C$_{10}$ alkyl; R' is a linear or branched C$_1$ to C$_{10}$ alkyl or alkylol; R" is selected from H and halogen; n and m* are each an integer from 0 to 10; R* represents an acid labile group cleavable by a photoacid generator; R** is selected from R' and R* as defined above and tertiary C$_4$ to C$_{20}$ alkyl and cycloalkyl, C$_1$ to C$_6$ trialkylsilyl groups, and C$_4$ to C$_{20}$ oxoalkyl; R*** is selected from H, —CH$_2$OR''', —C(O)OR''' and —C(O)R''', where R''' is selected from methyl, ethyl, t-butyl, and C$_1$ to C$_{20}$ linear or branched cycloaliphatic, R$^{18}$ is selected from H, and linear, branched or cyclic C$_1$-C$_{24}$ alkyl, aryl, aralkyl, and alkaryl, Y is selected from F and Cl and at least one occurrence of Y is F;

c) C$_1$ to C$_{30}$ linear, branched, or cyclic alkyl, aryl, aralkyl, alkaryl, alkenyl or alkynyl containing one or more hetero atoms selected from O, N, and Si;

d) a hydroxy alkyl ether according to Formula (IV):

-A-O—[—(CR$^{35}$$_2$—)$_q$—O—]$_p$—(CR$^{35}$$_2$—)$_q$—OH (IV)

wherein A is a linking group selected from C$_1$ to C$_6$ linear, branched, or cyclic alkylene, each occurrence of R$^{35}$ is independently selected from H, methyl, ethyl and a halide, q is from 1 to 5, and p is from 0 to 3;

e) a group according to Formula (V):

—R$^{36}$—Z (V)

where R$^{36}$ is a linear, branched or cyclic C$_1$ to C$_{30}$, optionally partially or completely halogenated, alkylene, arylene, aralkylene, alkarylene, alkenylene or alkynylene linking group and Z is a functional group selected from hydroxyl, carboxylic acid, amine, thiol, isocyanate and epoxy; and f) C$_r$X"$_{2r+1}$, wherein X" is independently a halogen selected from fluorine, chlorine, bromine or iodine and r is an integer from 1 to 20; and a second monomer unit according to Formula (II):

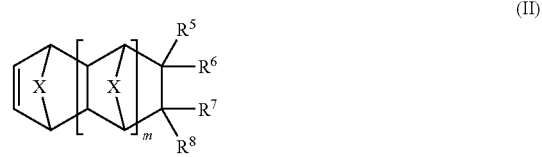

(II)

wherein m is an integer from 0 to 5; X is selected from —CH$_2$—, —CH$_2$—CH$_2$—, O, S, and —NH—; R$^5$ to R$^8$ are independently selected from H, —(CH$_2$)$_n$—C(O)OR", —(CH$_2$)$_n$—OR', Si(OR')$_3$, —(CB$_2$)$_n$—OC(O)R", —(CH$_2$)$_n$—OC(O)OR", —(CH$_2$)$_n$—C(O)R', —(CH$_2$)$_n$C(R*)$_2$CH (R*)(C(O)OR**), —(CH$_2$)$_n$C(R*)$_2$CH(C(O)OR**)$_2$, —C(O)O—(CH$_2$)$_n$—OR' and —(CH$_2$)$_n$—O—(CH$_2$)$_n$—OR', wherein n is independently an integer from 0 to 10; B is hydrogen or a halogen; R* and R are independently hydrogen, a halogen, C$_1$ to C$_{10}$ linear or branched alkyl or cycloalkyl, or C$_1$ to C$_{10}$ linear or branched halogenated alkyl or cycloalkyl; R** is independently C$_1$ to C$_{10}$ linear or branched alkyl or cycloalkyl or C$_1$ to C$_{10}$ linear or branched halogenated alkyl cycloalkyl; and R" is independently C$_1$ to C$_{10}$ linear or branched alkyl or halogenated alkyl, C$_4$ to C$_{20}$ monocyclic or polycyclic cycloaliphatic or halogenated cycloalkyl moiety, a cyclic ether, a cyclic ketone or a cyclic ester (lactone), wherein each of the cyclic ether, ketone and ester can be halogenated or not.

24. A positive tone photoresist composition comprising,
   (a) a solvent,
   (b) a photosensitive acid generator; and
   (c) one or more positive tone imaging polymers, wherein the positive tone imaging polymers contain a functional group containing moiety that contains a group that can be cleaved when exposed to radiation, rendering the polymer more soluble to a developer than the unexposed polymer,
   wherein the positive tone imaging polymer is prepared by a method of polymerizing poly(cyclic)olefin monomers comprising:
   (a) combining a monomer composition comprising one or more poly(cyclic)olefin monomers, a non-olefinic chain transfer agent and an optional activator compound in a reaction vessel to form a mixture; and
   (b) adding a polymerization catalyst containing Ni and/or Pd, the catalyst causing the mixture to polymerize;
   wherein the non-olefinic chain transfer agent includes one or more compounds selected from the group consisting of H$_2$, alkylsilanes, alkylalkoxysilanes, alkylgermanes, alkylalkoxygermanes, alkylstannanes and alkylalkoxystannanes.

25. A method of generating a positive tone resist image on a substrate comprising the steps of:
   (a) coating a substrate with a film comprising the positive tone photoresist composition of claim 24;
   (b) imagewise exposing the film to radiation to form an image; and
   (c) developing the image in the film where selected portions of the substrate are exposed.

26. The method of claim 25, wherein the substrate includes one or more of silicon, ceramics, and polymers.

27. The method of claim 25, wherein the film is coated on the substrate in using one or more methods selected from spin coating, spray coating and doctor blading.

28. The method of claim 25, wherein the film is imagewise exposed from a radiation source selected from mercury lamps, mercury/xenon lamps, xenon lamps, argon fluoride lasers, krypton fluoride lasers, fluorine lasers, x-rays and electron beams at a wavelength of from 90 nm to 514 nm.

29. The method of claim 25, wherein a solvent is used to develop the positive tone image and the solvent comprises an aqueous base.

30. An integrated circuit assembly method comprising the steps of:
   (a) coating a substrate with the positive tone photoresist composition according to claim 24;
   (b) imagewise exposing the film to radiation to form an image;
   (c) developing the image in the film where selected portions of the substrate are exposed; and
   (d) transferring the developed image to the substrate.

* * * * *

UNITED STATES PATENT AND TRADEMARK OFFICE
CERTIFICATE OF CORRECTION

| | | |
|---|---|---|
| PATENT NO. | : 7,888,415 B2 | Page 1 of 1 |
| APPLICATION NO. | : 12/699909 | |
| DATED | : February 15, 2011 | |
| INVENTOR(S) | : Rhodes et al. | |

It is certified that error appears in the above-identified patent and that said Letters Patent is hereby corrected as shown below:

Face of the Patent, See Item (57) ABSTRACT, line 4, "to faun a mixture;" should read
-- to form a mixture --

Column 47, line 19, Claim 22, "R' is selected from H" should read
-- R" is selected from H --

Signed and Sealed this
Tenth Day of May, 2011

David J. Kappos
*Director of the United States Patent and Trademark Office*